United States Patent
Miyano et al.

(10) Patent No.: US 12,510,797 B2
(45) Date of Patent: Dec. 30, 2025

(54) LIGHT MODULATOR AND LIGHT MODULATOR ARRAY

(71) Applicants: The University of Tokyo, Tokyo (JP); HAMAMATSU PHOTONICS K.K., Hamamatsu (JP)

(72) Inventors: Hiroki Miyano, Tokyo (JP); Go Soma, Tokyo (JP); Taichiro Fukui, Tokyo (JP); Takuo Tanemura, Tokyo (JP); Yoshiro Nomoto, Hamamatsu (JP)

(73) Assignees: The University of Tokyo, Tokyo (JP); HAMAMATSU PHOTONICS K.K., Hamamatsu (JP)

( * ) Notice: Subject to any disclaimer, the term of this patent is extended or adjusted under 35 U.S.C. 154(b) by 675 days.

(21) Appl. No.: 17/884,608

(22) Filed: Aug. 10, 2022

(65) Prior Publication Data

US 2023/0054271 A1   Feb. 23, 2023

(30) Foreign Application Priority Data

Aug. 19, 2021   (JP) .................................. 2021-133941

(51) Int. Cl.
*G02F 1/35*   (2006.01)
*G02F 1/355*   (2006.01)

(52) U.S. Cl.
CPC .......... *G02F 1/3503* (2021.01); *G02F 1/3551* (2013.01); *G02F 2201/12* (2013.01); *G02F 2203/02* (2013.01)

(58) Field of Classification Search
CPC ............ G02B 21/0032; G02B 21/0076; G02B 21/06; G02B 21/36; G02B 21/361;
(Continued)

(56) References Cited

U.S. PATENT DOCUMENTS 5,552,916 A * 9/1996 O'Callaghan ........... G02F 1/292
  349/201
5,991,065 A   11/1999 Nutt et al.
(Continued)

FOREIGN PATENT DOCUMENTS

CN   101281301 A   10/2008
JP   2007065458 A * 3/2007 ............. C09K 11/06
(Continued)

OTHER PUBLICATIONS

Damgaard-Carstensen, C. et al., "Electrical Tuning of Fresnel Lens in Reflection," ACS Photonics vol. 8, 2021, pp. 1576-1581.
(Continued)

*Primary Examiner* — Sharrief I Broome
*Assistant Examiner* — Journey F Sumlar
(74) *Attorney, Agent, or Firm* — Faegre Drinker Biddle & Reath LLP

(57) ABSTRACT

A light modulator includes a base layer, a metal reflective layer formed on the base layer, a modulation layer of a nonlinear optical crystal formed on the reflective layer, and a conductive pattern layer including a plurality of pattern portions arranged periodically in a first direction and each extending in a second direction, and formed on the modulation layer. The modulation layer changes a reflectance for object light by changing a refractive index when a voltage is applied between the reflective layer and the conductive pattern layer. The light modulator outputs the object light being incident from an upper surface side of the modulation layer, transmitted through the modulation layer, and reflected by the reflective layer to the outside as modulated light with an intensity modulated by the reflectance change.

6 Claims, 17 Drawing Sheets

(58) Field of Classification Search
CPC ............ G02B 2207/113; G02F 1/0018; G02F 1/030558; G02F 2202/32; G02F 2203/12; H04N 5/2258

See application file for complete search history.

(56) References Cited

U.S. PATENT DOCUMENTS

| | | | | |
|---|---|---|---|---|
| 6,590,695 B1 * | 7/2003 | Kurtz | ................... | G02B 5/3058 |
| | | | | 359/291 |
| 2019/0196164 A1 * | 6/2019 | Takizawa | ................ | G02F 1/292 |

FOREIGN PATENT DOCUMENTS

| | | | | |
|---|---|---|---|---|
| JP | 2007-240617 A | 9/2007 | | |
| WO | WO-2017/057700 A1 | 4/2017 | | |
| WO | WO-2017/213100 A1 | 12/2017 | | |
| WO | WO-2018161734 A1 * | 9/2018 | ........... | G02F 1/0126 |
| WO | WO-2019/111333 A1 | 6/2019 | | |
| WO | WO-2020/137632 A1 | 7/2020 | | |
| WO | WO-2020/203856 A1 | 10/2020 | | |

OTHER PUBLICATIONS

Ogawa, S. et al., "Metal-Insulator-Metal-Based Plasmonic Metamaterial Absorbers at Visible and Infrared Wavelengths: A Review," Materials vol. 11, 458, 2018, pp. 1-18.

Zhang, J. et al., "Electrical tuning of metal-insulator-metal metasurface with electro-optic polymer," Appl. Phys. Lett. vol. 113, 2018, p. 231102-1-p. 231102-5.

* cited by examiner

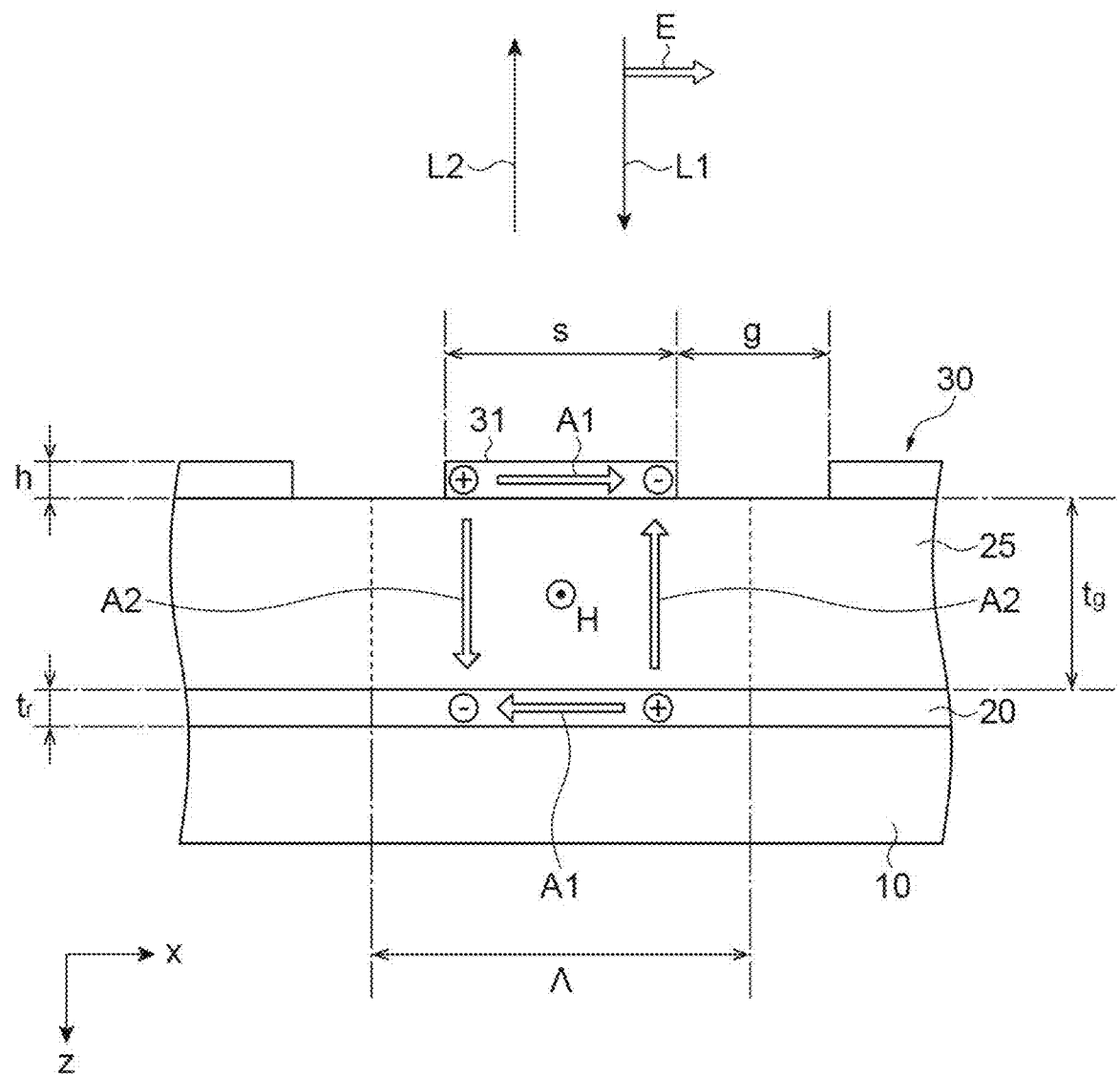

LIGHT MODULATOR AND LIGHT MODULATOR ARRAY

TECHNICAL FIELD

The present disclosure relates to a light modulator for modulating an intensity of modulation object light, and a light modulator array in which light modulators are arranged in an array.

BACKGROUND

Non Patent Document 1 discloses a light modulator using an electro-optic (EO) polymer. The light modulator described in Non Patent Document 1 includes a lower Au layer serving as a reflective layer, and an EO polymer layer and an upper Au layer formed on the lower Au layer. Further, the EO polymer layer and the upper Au layer are formed with a grating pattern in which a plurality of pattern portions are arranged periodically in a predetermined direction. In this light modulator, an intensity of object light being a modulation object is modulated by changing a reflectance by application of a voltage between the lower Au layer and the upper Au layer sandwiching the EO polymer layer.

Non Patent Document 2 discloses a reflection type Fresnel lens element using lithium niobate (LN) of a nonlinear optical crystal. The lens element described in Non Patent Document 2 includes a lower Au layer serving as a reflective layer, an LN thin film layer formed on the lower Au layer, and an upper Au layer formed in a concentric circular pattern on the LN layer. In this lens element, an operation of the Fresnel lens by the pattern of the upper Au layer is controlled by application of a voltage between the lower Au layer and the upper Au layer sandwiching the LN layer.

Non Patent Document 1: J. Zhang et al., "Electrical tuning of metal-insulator-metal metasurface with electro-optic polymer", Appl. Phys. Lett. Vol. 113 (2018) pp.231102-1-231102-5

Non Patent Document 2: C. Damgaard-Carstensen et al., "Electrical Tuning of Fresnel Lens in Reflection", ACS Photonics Vol. 8 (2021) pp.1576-1581

Non Patent Document 3: S. Ogawa and M. Kimata, "Metal-Insulator-Metal-Based Plasmonic Metamaterial Absorbers at Visible and Infrared Wavelengths: A Review", Materials Vol. 11, 458 (2018)

SUMMARY

As a spatial light modulator (SLM) used for modulating light, for example, a liquid crystal on silicon (LCOS) type SLM for modulating a phase of light using a liquid crystal layer is used. In the configuration in which the liquid crystal layer is used for light modulation as in the LCOS type SLM, an operation speed thereof depends on a response speed of the liquid crystal, and as a result, the response speed of the light modulator is limited to, for example, less than 1 kHz.

On the other hand, in the light modulator described in Non Patent Document 1 described above, intensity modulation of the object light can be performed at high speed by using the EO polymer which responds at higher speed than the liquid crystal in the modulation layer. However, in this light modulator, absorption of light by the EO polymer is large at wavelengths shorter than the wavelength of 1300 nm, for example, and it is difficult to operate in such a wavelength region.

An object of an embodiment is to provide a light modulator and a light modulator array capable of modulating an intensity of modulation object light at high speed and suitably operating in a wide wavelength region.

An embodiment is a light modulator. The light modulator includes (1) a base layer; (2) a reflective layer made of a metal material having a reflecting property for object light being a modulation object and formed on an upper surface of the base layer; (3) a modulation layer made of a nonlinear optical crystal having a transmitting property for the object light and formed on an upper surface of the reflective layer with a predetermined thickness; and (4) a conductive pattern layer made of a conductive material, including a plurality of pattern portions arranged periodically in a first direction perpendicular to a lamination direction of the respective layers and each extending in a second direction perpendicular to the lamination direction and the first direction, and formed on an upper surface of the modulation layer, and (5) the modulation layer is configured to change a reflectance for the object light by changing a refractive index when a voltage is applied between the reflective layer and the conductive pattern layer, and the object light being incident from the upper surface of the modulation layer through the conductive pattern layer, transmitted through the modulation layer, and reflected by the reflective layer is output from the upper surface of the modulation layer to the outside as modulated light with an intensity modulated by the reflectance change.

In the light modulator of the above configuration, the modulation layer made of the nonlinear optical crystal and the grating-shaped conductive pattern layer including the plurality of pattern portions periodically arranged in the predetermined direction are formed on the upper surface of the metal reflective layer provided on the base layer, and the upper surface side of the modulation layer and the conductive pattern layer opposite to the base layer is set as an incident surface for the modulation object light. Further, the reflective layer and the conductive pattern layer provided with the modulation layer interposed therebetween are made to function as a lower electrode layer and an upper electrode layer, respectively.

Further, in the above configuration, the voltage is applied between the reflective layer and the conductive pattern layer to change the refractive index of the modulation layer and control the reflectance for the object light, and thus, the intensity of the object light is modulated. According to the above configuration, it is possible to realize the light modulator capable of performing intensity modulation of the modulation object light at high speed and suitably operating in a wide wavelength region by using the nonlinear optical crystal which responds at higher speed than the liquid crystal and can be applied to the object light having wavelengths shorter than the wavelength of 1300 nm in the modulation layer.

An embodiment is a light modulator array. The light modulator array includes a plurality of light modulators of the above configuration, and the plurality of light modulators are arranged in a one-dimensional or two-dimensional array. Further, specifically, for example, in the light modulator array, with M being an integer of 1 or more and N being an integer of 2 or more, the plurality of light modulators may be arranged in a one-dimensional or two-dimensional array in M rows and N columns. According to the above configuration, it is possible to suitably realize intensity modulation of the object light by a one-dimensional or two-dimensional modulation pattern using the light modulator of the above configuration as a modulation cell (modulation pixel).

According to the light modulator and the light modulator array of the embodiments, it is possible to modulate an intensity of modulation object light at high speed and suitably operate in a wide wavelength region.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a partially enlarged view of the configuration of the light modulator illustrated in FIG. 2A.

DETAILED DESCRIPTION

Figure 1:
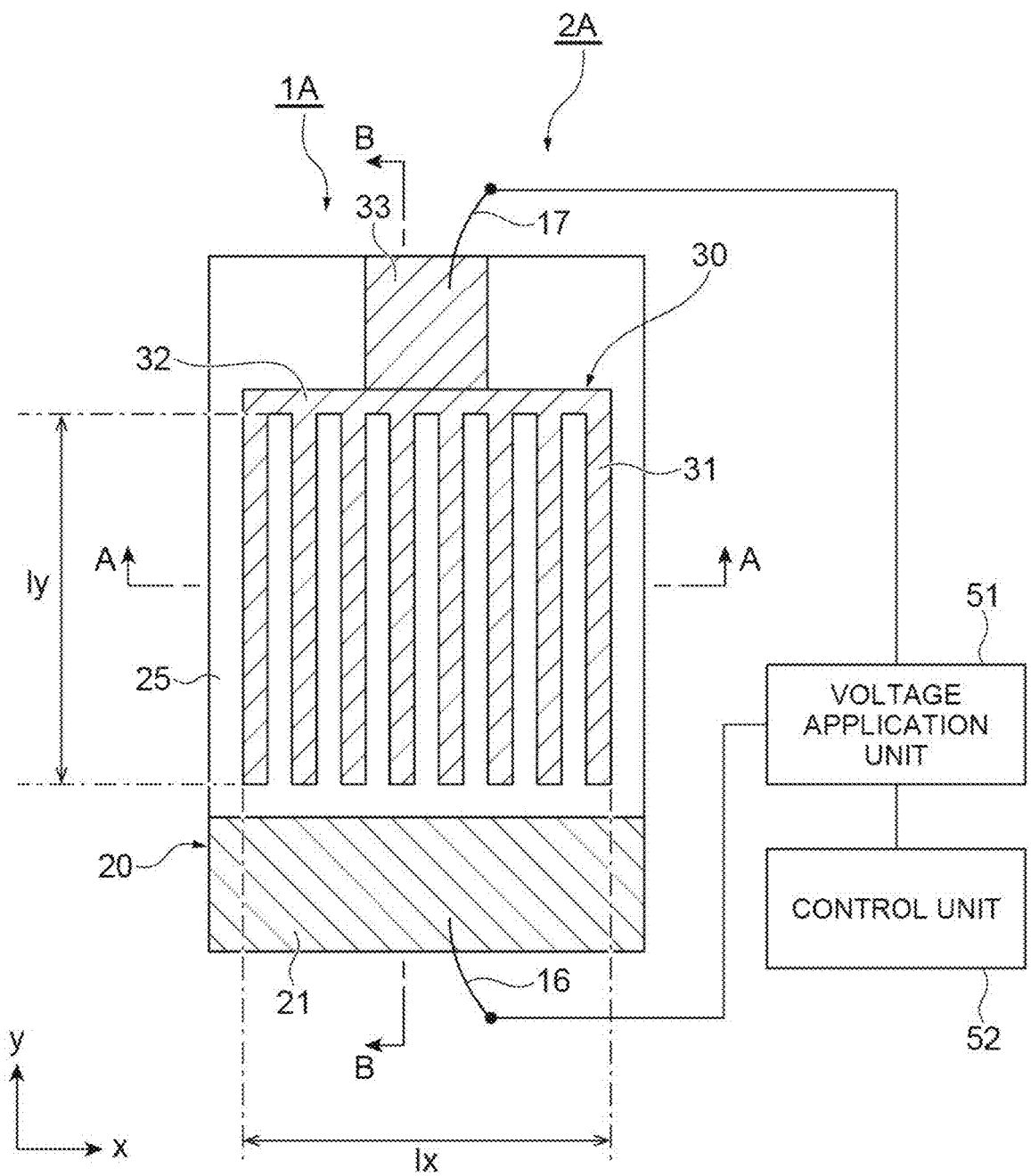
FIG. 1 is a plan view illustrating a configuration of an embodiment of a light modulation apparatus including a light modulator.

Hereinafter, embodiments of a light modulator and a light modulator array will be described in detail with reference to the accompanying drawings. In the description of the drawings, the same elements will be denoted by the same reference signs, and redundant description will be omitted. Further, the dimensional ratios in the drawings are not always coincident with those in the description.

Figure 2A:
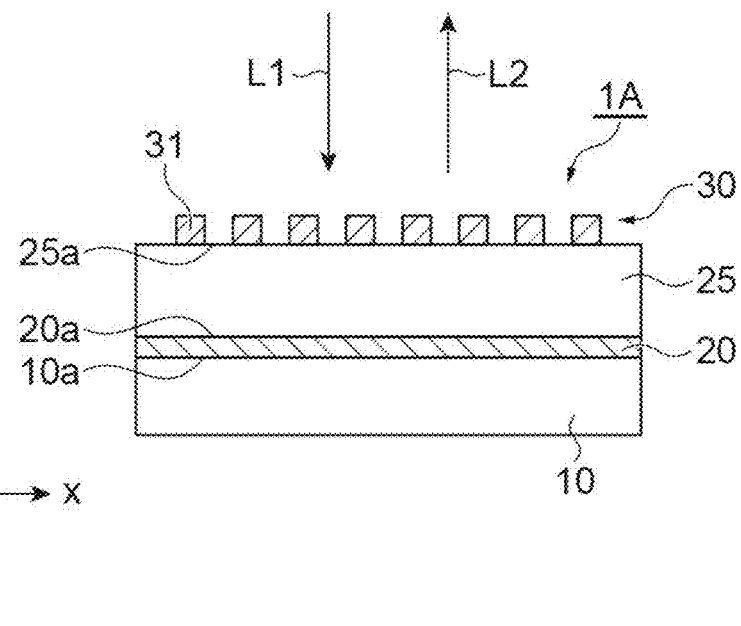
FIG. 2A and FIG. 2B are (A) a cross-sectional side view taken along a line A-A, and (B) a cross-sectional side view taken along a line B-B, illustrating the configuration of the light modulator illustrated in FIG. 1.
Figure 2B:
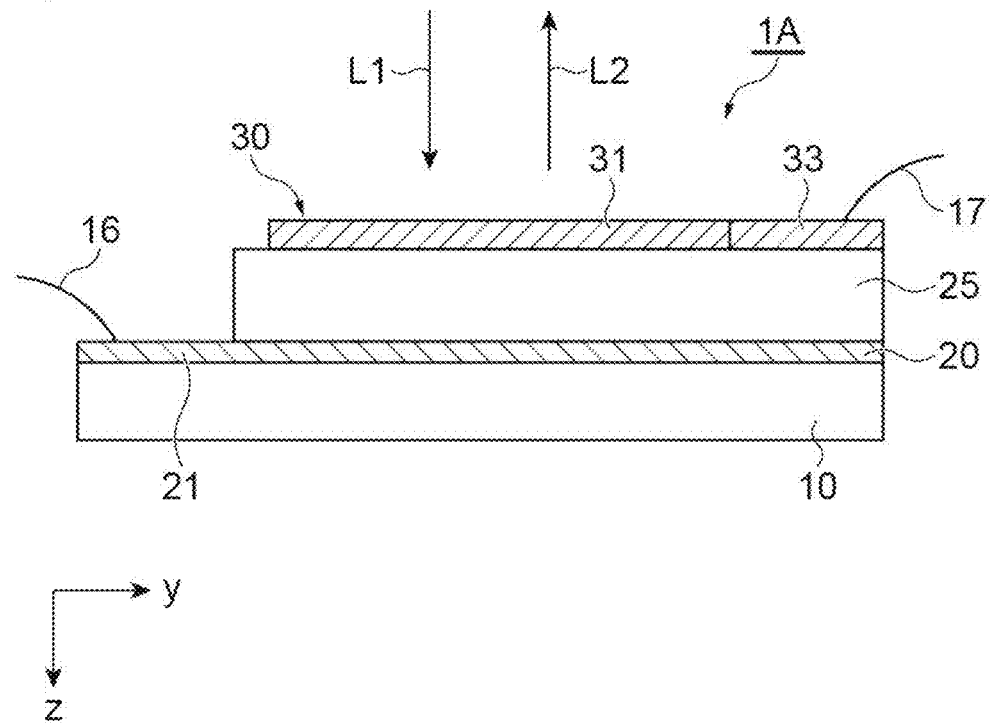

FIG. 1 is a plan view illustrating a configuration of an embodiment of a light modulation apparatus including a light modulator. FIG. 2A and FIG. 2B are diagrams illustrating a configuration of the light modulator illustrated in FIG. 1, and FIG. 2A illustrates a cross-sectional side view taken along a line A-A, and FIG. 2B illustrates a cross-sectional side view taken along a line B-B. Further, FIG. 3 is a partially enlarged view illustrating the configuration of the light modulator illustrated in FIG. 2A, and for describing an operation of the light modulator.

In addition, in the following drawings, an xyz orthogonal coordinate system is also indicated for ease of description. In the coordinate system, a z-axis indicates a lamination direction of respective layers (thickness direction of respective layers) constituting the light modulator, and indicates an incident direction of modulation object light for the light modulator. Further, an x-axis indicates a first direction perpendicular to the lamination direction. Further, a y-axis indicates a second direction perpendicular to the lamination direction and the first direction.

A light modulation apparatus 2A according to the present embodiment includes a light modulator 1A, a voltage application unit 51, and a control unit 52. Further, the light modulator 1A is a device for performing intensity modulation on object light L1 incident as a modulation object and outputting modulated light L2 to the outside, and includes a base layer 10, a reflective layer 20, a modulation layer 25, and a conductive pattern layer 30.

The base layer 10 is a support layer for supporting the respective layers constituting the light modulator 1A. As a material constituting the base layer 10, an arbitrary material may be used as long as it can form and support the respective layers of the light modulator 1A. As the base layer 10, specifically, for example, a quartz ($SiO_2$) substrate, a silicon (Si) substrate, or the like may be used.

The reflective layer 20 is made of a metal material having a reflecting property for the object light L1 being the modulation object, and is formed on an upper surface 10a of the base layer 10. The reflective layer 20 also functions as a lower electrode layer for applying a voltage to the modulation layer 25. As the metal material constituting the reflective layer 20, for example, Au (gold), Al (aluminum), Ag (silver), Pt (platinum), Ti (titanium), Cr (chromium), or the like may be used.

The modulation layer 25 is made of a nonlinear optical crystal having a transmitting property for the object light L1, and is formed on an upper surface 20a of the reflective layer 20 with a predetermined thickness. As the nonlinear optical crystal constituting the modulation layer 25, for example, a nonlinear optical material such as lithium niobate (LN, $LiNbO_3$) or lithium tantalate (LT, $LiTaO_3$) may be used.

The conductive pattern layer 30 is made of a conductive material, and is formed with a predetermined pattern on an upper surface 25a of the modulation layer 25. The conductive pattern layer 30 also functions as an upper electrode layer for applying a voltage to the modulation layer 25 together with the reflective layer 20 of the lower electrode layer. As the conductive material constituting the conductive pattern layer 30, for example, a metal material such as Au (gold), Al (aluminum), Ag (silver), Pt (platinum), Ti (titanium), or Cr (chromium) may be used.

The conductive pattern layer 30 is, specifically, formed with a grating pattern including a plurality of pattern portions 31 arranged periodically in the x-axis direction perpendicular to the z-axis direction being the lamination direction of the respective layers constituting the light modulator 1A. Each of the plurality of pattern portions 31 is formed with a linear pattern having a predetermined width and extending in the y-axis direction perpendicular to the z-axis direction and the x-axis direction. Further, the pattern width of the plurality of pattern portions 31 is preferably set to be constant.

The plurality of pattern portions 31 are electrically coupled to an electrode pattern portion 33 via a connection pattern portion 32 formed on one side in the y-axis direction (upper side in the drawing) on the modulation layer 25. Further, the modulation layer 25 and the conductive pattern layer 30 are not provided in a region having a predetermined width on the other side in the y-axis direction (lower side in the drawing, the side opposite to the electrode pattern portion 33), and a portion of the reflective layer 20 exposed in this region is an electrode portion 21.

In the above configuration, the modulation layer 25 formed of the nonlinear optical crystal is configured to change a reflectance for the object light L1 in the light modulator 1A by changing a refractive index by application of a voltage (application of an electric field) between the reflective layer 20 and the conductive pattern layer 30. As illustrated in FIG. 2A and FIG. 2B, the object light L1 is incident on the light modulator 1A from the upper surface 25a of the modulation layer 25 through the conductive pattern layer 30. Then, the object light L1 transmitted through the modulation layer 25 and reflected by the reflective layer 20 is output from the upper surface 25a of the modulation layer 25 to the outside as the modulated light L2 having an intensity modulated by the reflectance change. In addition, the light modulation operation in the light modulator 1A will be described in detail later.

In the light modulation apparatus 2A, as illustrated in FIG. 1, the voltage application unit 51 and the control unit 52 are provided for the light modulator 1A of the above configuration. One terminal of the voltage application unit 51 is electrically coupled to the electrode portion 21 of the reflective layer 20 via a wire 16, and the other terminal is electrically coupled to the electrode pattern portion 33 of the conductive pattern layer 30 via a wire 17. Thus, a predetermined voltage is applied between the reflective layer 20 and the conductive pattern layer 30 from the voltage application unit 51.

The control unit 52 controls an intensity modulation operation for the modulation object light L1 in the light modulator 1A by controlling a voltage application operation (electric field application operation) to the light modulator 1A by the voltage application unit 51. In the above configuration, as the voltage application unit 51, for example, a power supply device may be used. Further, as the control unit 52, for example, a computer including a CPU, a storage unit, a display unit, an input unit, and the like may be used.

In the light modulator 1A, a region where the plurality of pattern portions 31 of the grating structure in the conductive pattern layer 30 are provided functions as a modulation region for modulating an intensity of the object light L1. In the configuration example of FIG. 1, a width of the modulation region in the x-axis direction is 1x, and a width in the y-axis direction is 1y. The above modulation region serves as a unit modulation cell when a light modulator array is configured as described later, and a cell size thereof is, for example, $1x \times 1y = 300$ μm $\times 300$ μm.

Further, as illustrated in FIG. 3, in the light modulator 1A, a width of the pattern portion 31 in the grating pattern constituting the conductive pattern layer 30 is set to s, an interval is set to g, a height is set to h, and an arrangement period in the x-axis direction is set to $\Lambda$ ($=s+g$). A cross-sectional shape of each pattern portion in the conductive pattern layer 30 may be an arbitrary shape depending on specific design conditions and manufacturing conditions, and is, for example, a rectangular shape, a trapezoidal shape, or a rectangular or trapezoidal shape having rounded vertices. Further, a thickness of the metal layer constituting the reflective layer 20 is set to tr, and a thickness of the modulation layer 25 is set to tg.

In the light modulator 1A having the above configuration, the arrangement period $\Lambda$ of the plurality of pattern portions 31 in the conductive pattern layer 30 is preferably set to be less than a wavelength $\lambda$ of the object light L1 being an intensity modulation object. As described above, in the pattern portions 31 of the conductive pattern layer 30 arranged on the modulation layer 25, by using a subwavelength structure (metasurface structure) in which the arrangement period $\Lambda$ is set to be smaller than the object wavelength $\lambda$, it is possible to suppress generation of high-order diffracted light and suitably realize the modulation of the object light L1 using the modulation layer 25 of the nonlinear optical crystal. Further, in the configuration using the subwavelength structure, the modulation cell can be downsized and integrated, and the size of the modulation pixel can be made smaller than that in the LCOS type SLM using the liquid crystal layer.

The intensity modulation operation for the object light L1 in the light modulator 1A having the above configuration will be described with reference to FIG. 3. In addition, in the following description, as to the specific materials of the respective layers constituting the light modulator 1A, the base layer 10 is set to an $SiO_2$ layer ($SiO_2$ substrate), the reflective layer 20 and the conductive pattern layer 30 are set to Au layers, and the nonlinear optical crystal constituting the modulation layer 25 is set to lithium niobate (LN).

Further, in the calculation of the properties and the like of the light modulator 1A, unless otherwise specified, the thicknesses of the reflective layer 20 and the conductive pattern layer 30 are set to tr=h=100 nm, and the thickness of the LN modulation layer 25 of Z-cut is set to tg=500 nm. Further, the arrangement period of the pattern portions 31 in the conductive pattern layer 30 is set to $\Lambda=710$ nm, and the ratio between the pattern width s and the arrangement period $\Lambda$ is set to 0.825. In this case, the pattern width in the conductive pattern layer 30 is s=586 nm.

The light modulator 1A according to the present embodiment has a metal-insulator-metal (MIM) structure in which the modulation layer 25 made of the nonlinear optical crystal being an insulating material is sandwiched between the reflective layer 20 and the conductive pattern layer 30 made of the metal materials (see Non Patent Document 3 for a general MIM structure). TM polarized light is perpendicularly incident on the light modulator 1A of the MIM structure as the modulation object light L1, as a direction of an electric field is indicated by an arrow E in FIG. 3.

In this case, the object light L1 of the TM polarized light is efficiently coupled to a MIM resonator mode and absorbed by the metal at a wavelength λ determined according to the period Λ of the grating pattern in the conductive pattern layer 30. By the above absorption of the object light L1, a dip in which a reflectance decreases occurs in a reflection spectrum of the object light L1.

Further, in the above configuration, a refractive index of the nonlinear optical crystal constituting the modulation layer 25 is changed by applying a voltage between the reflective layer 20 and the conductive pattern layer 30. In this case, a resonance wavelength in the MIM resonator mode is shifted, and as a result, a reflectance for the object light L1 of the wavelength λ is changed. Intensity modulation can be performed on the object light L1 by using the reflectance change by the voltage application.

In addition, a refractive index change Δn due to the Pockels effect when an external voltage is applied to the modulation layer 25 made of the nonlinear optical crystal can be estimated by the following Formula (1).

$$\Delta n = -\tfrac{1}{2} n^3 r_{33} E \quad (1)$$

In the above Formula, n is a refractive index of the nonlinear optical crystal, $r_{33}$ is a nonlinear optical constant of the z-axis direction of the nonlinear optical crystal, and E is a value obtained by dividing the applied voltage to the modulation layer 25 by the thickness of the modulation layer 25. When the nonlinear optical crystal is lithium niobate (LN), the nonlinear optical constant is $r_{33}$=31.45 pm/V. Further, a transmitting wavelength range is, for example, 0.35 μm to 4.5 μm.

Figure 4:
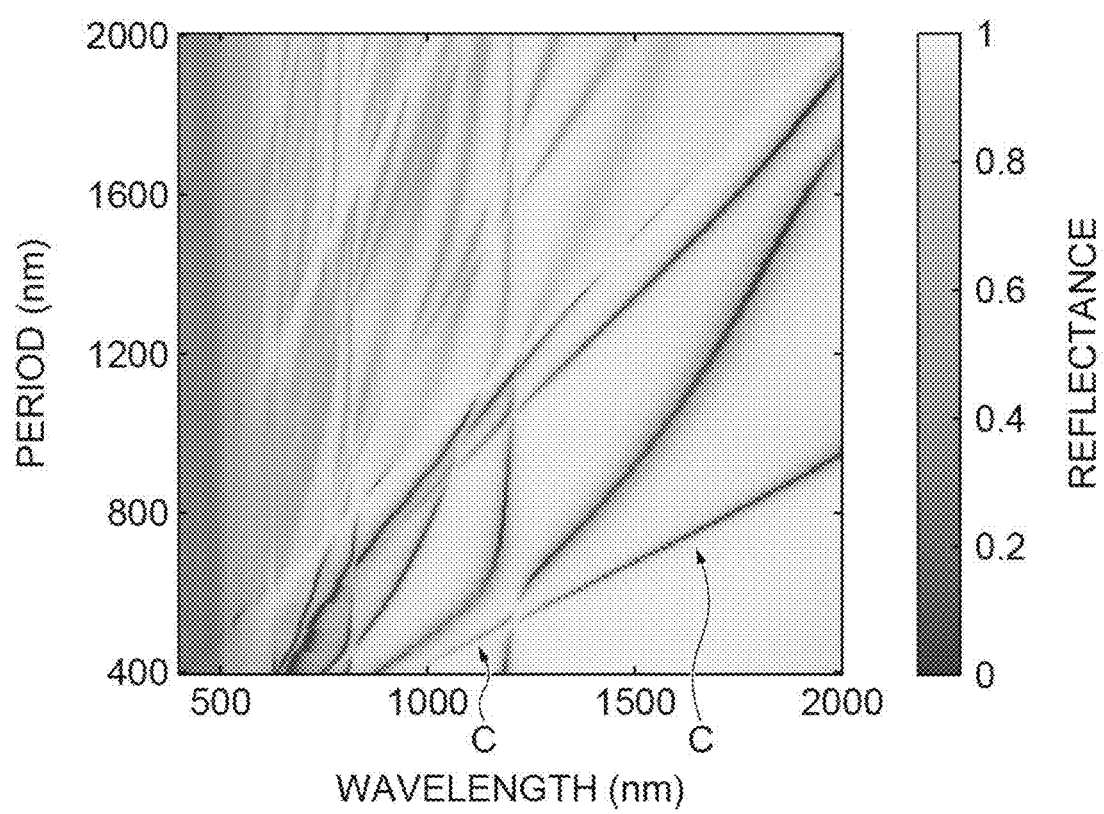
FIG. 4 is a diagram showing a change of a reflection spectrum when an arrangement period of a grating pattern in a conductive pattern layer is changed.

FIG. 4 is a diagram showing a change in reflection spectrum when the arrangement period Λ of the grating pattern in the conductive pattern layer 30 is changed. In the reflectance distribution diagram of FIG. 4, the horizontal axis indicates the wavelength (nm) of the object light L1, and the vertical axis indicates the arrangement period Λ (nm) of the pattern in the conductive pattern layer 30. Further, in this diagram, calculation results of the reflection property by a two-dimensional finite difference time domain (FDTD) method is shown.

As shown in FIG. 4, it is understood that the diffraction is suppressed and the dip of the reflectance due to a sharp resonance of the MIM mode is obtained in a subwavelength region in which the pattern period Λ in the conductive pattern layer 30 is set to the wavelength or less. In the light modulator 1A according to the present embodiment, for example, the intensity modulation of the object light L1 can be performed by using a linearly extending dip region indicated by a symbol C in FIG. 4.

Figure 5:
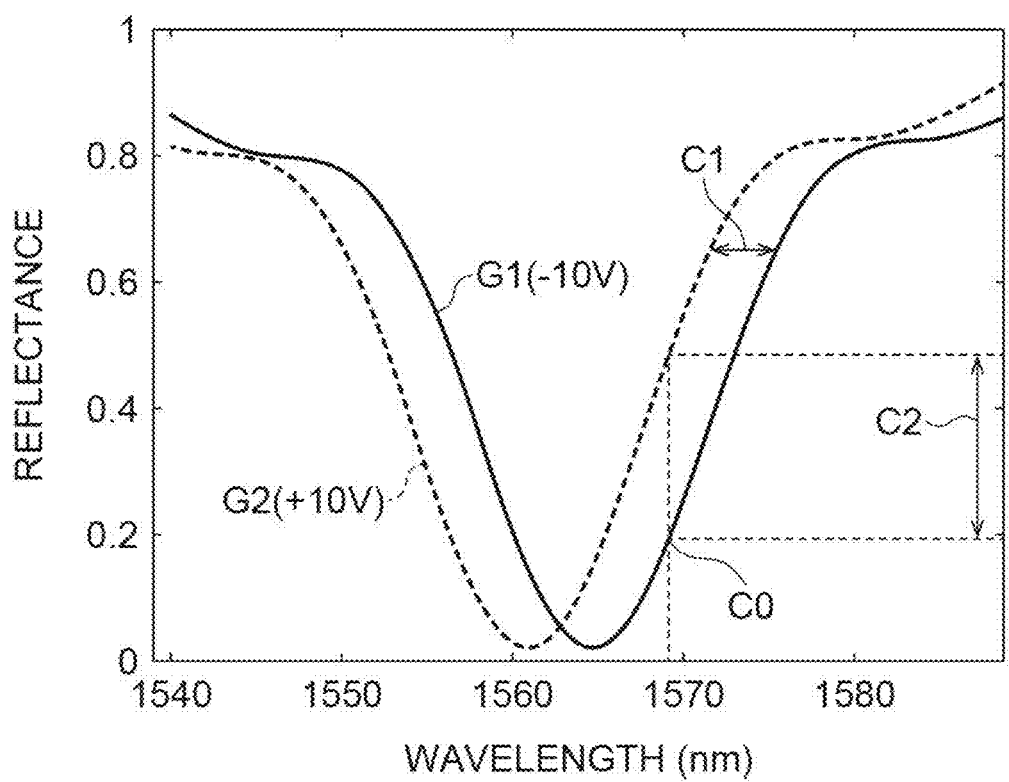
FIG. 5 is a graph showing wavelength dependency of a reflectance of light in the light modulator.
Figure 6:
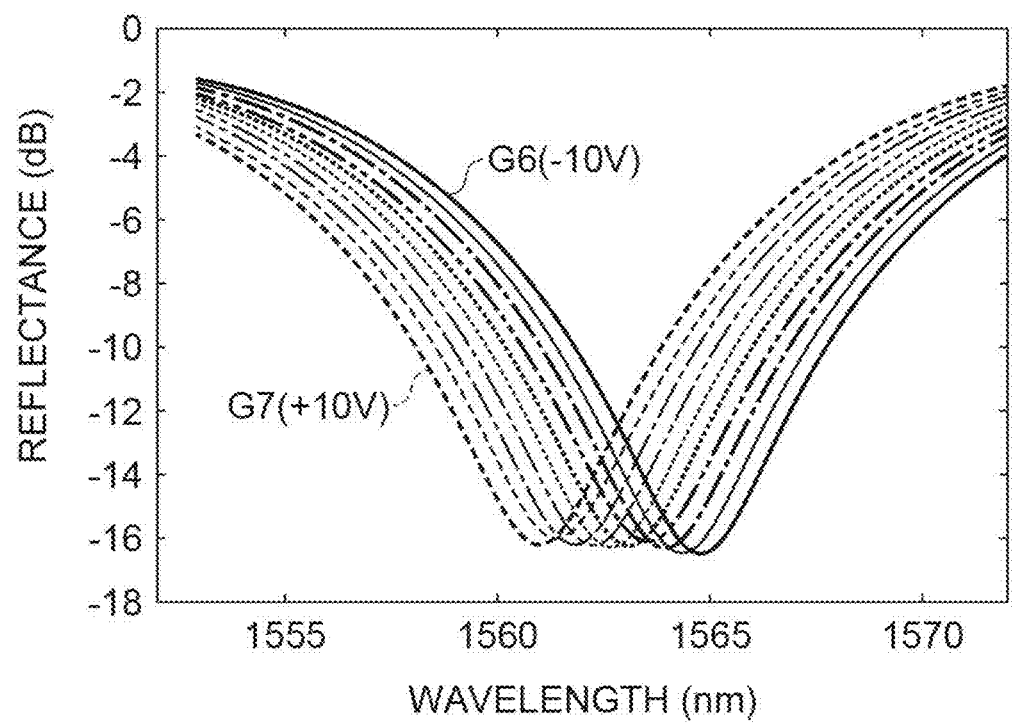
FIG. 6 is a graph showing wavelength dependency of the reflectance of light in the light modulator.

As an example of the configuration and the operation of the light modulator 1A, the reflectance change by the voltage application in the configuration in which the pattern period Λ is set to 710 nm, and the intensity modulation of the object light L1 by the reflectance change will be described. FIG. 5 and FIG. 6 are graphs showing wavelength dependency of the reflectance of light in the light modulator 1A.

In the graph of FIG. 5, the horizontal axis indicates the wavelength (nm) of the object light, and the vertical axis indicates the reflectance. Further, in FIG. 5, a graph G1 shows a reflectance property when the applied voltage to the conductive pattern layer 30 with respect to the reflective layer 20 is set to −10 V, and a graph G2 shows a reflectance property when the applied voltage is set to +10 V.

In the graph of FIG. 6, the horizontal axis indicates the wavelength (nm) of the object light, and the vertical axis indicates the reflectance (dB). Further, in FIG. 6, a graph G6 shows a reflectance property corresponding to the graph G1 when the applied voltage is set to −10 V, and a graph G7 shows a reflectance property corresponding to the graph G2 when the applied voltage is set to +10 V. In addition, FIG. 6 also includes graphs showing a change of the reflectance property when the applied voltage changes from −10 V to +10 V. The applied voltages in these graphs are, in order from −10 V to +10 V, −10 V, −7.78 V, −5.56 V, −3.33 V, −1.11 V, +1.11 V, +3.33 V, +5.56 V, +7.78 V, and +10 V.

As shown in FIG. 5 and FIG. 6, in the light modulator 1A of the above configuration, by applying the voltage between the reflective layer 20 and the conductive pattern layer 30, the reflectance property such as a dip position in the reflectance for the object light L1 is changed. In FIG. 5, a symbol C1 indicates a wavelength shift of the reflectance property by the voltage application.

Further, for example, when a wavelength of 1569 nm indicated by a symbol C0 in FIG. 5 is set as an operation point of the intensity modulation, a range indicated by a symbol C2 becomes a range of the intensity modulation when the applied voltage is set to −10 V to +10 V. In this operation example, the intensity modulation with an insertion loss of 3.6 dB and an extinction ratio of 4.6 dB is obtained with the voltage application of ±10V.

Effects of the light modulator 1A and the light modulation apparatus 2A according to the above embodiment will be described.

In the light modulator 1A illustrated in FIG. 1, FIG. 2A, and FIG. 2B, the modulation layer 25 made of the nonlinear optical crystal and the grating-shaped conductive pattern layer 30 including the plurality of pattern portions 31 periodically arranged in the x-axis direction are formed on the upper surface of the reflective layer 20 made of the metal material provided on the base layer 10, and the upper surface side of the modulation layer 25 and the conductive pattern layer 30 opposite to the base layer 10 is set as the incident surface for the modulation object light L1. Further, the reflective layer 20 and the conductive pattern layer 30 provided with the modulation layer 25 interposed therebetween are made to function as the lower electrode layer and the upper electrode layer, respectively.

Further, in the above configuration, the voltage is applied between the reflective layer 20 and the conductive pattern layer 30 to change the refractive index of the modulation layer 25 and control the reflectance for the object light L1, and thus, the intensity of the object light L1 is modulated. According to the above configuration, it is possible to realize the light modulator 1A capable of performing intensity modulation of the object light L1 at high speed and suitably operating in a wide wavelength region by using the nonlinear optical crystal which responds at higher speed than the liquid crystal and can be applied to the object light having wavelengths shorter than the wavelength of 1300 nm in the modulation layer 25. Further, the light modulator 1A has the configuration of vertical incidence type and reflection type as illustrated in FIG. 2A and FIG. 2B, and can be more highly integrated than a waveguide type light modulator or the like.

In the above light modulator 1A, the arrangement period Λ of the plurality of pattern portions 31 in the conductive pattern layer 30 is preferably set to be less than the wavelength λ of the object light L1. Further, the pattern width s of the plurality of pattern portions 31 in the conductive pattern layer 30 is preferably set to be constant. According to the above configurations, it is possible to suitably realize intensity modulation of the object light L1 in the light modulator 1A.

Further, in the light modulator 1A, it is preferable that the thickness of the reflective layer 20 and the thickness of the conductive pattern layer 30 are respectively set to be the skin depth or more. According to the above configuration, the reflectance control and the intensity modulation for the object light L1 by the metal reflective layer 20, the modulation layer 25, and the conductive pattern layer 30 can be suitably realized.

As to the materials of the respective layers constituting the light modulator 1A, specifically, the nonlinear optical crystal of the modulation layer 25 preferably includes at least one of lithium niobate (LN) and lithium tantalate (LT). Further, the metal material such as Au is preferably used as the conductive material of the conductive pattern layer 30.

In addition, in the configuration described in Non Patent Document 1, the EO polymer layer is used as the modulation layer in the light modulator. In this configuration, as described above, light absorption by the EO polymer is large at wavelengths shorter than the wavelength of 1300 nm. Further, in the configuration of this document, the modulation layer of the EO polymer is formed by a grating pattern together with the upper Au layer. In this configuration, when a voltage is applied, a short circuit is likely to occur via a pattern side surface.

Further, in the configuration described in Non Patent Document 2, lithium niobate is used, but the upper Au layer is formed in a pattern which is concentric and whose width is not constant, and functions as a Fresnel lens.

Further, Non Patent Document 3 describes a light absorber using the MIM structure. However, this document does not describe a configuration using the nonlinear optical crystal in the MIM structure, an operation as the light modulator by a voltage application to the modulation layer, and the like, and further, does not describe the modulation operation based on Formula (2) described later.

On the other hand, in the light modulator 1A of the above embodiment, the modulation layer 25 of the nonlinear optical crystal and the conductive pattern layer 30 are formed on the metal reflective layer 20, and the conductive pattern layer 30 is formed with the grating pattern including the plurality of pattern portions 31 arranged periodically in the x-axis direction and extending in the y-axis direction. Thus, it is possible to suitably realize the reflectance control and the intensity modulation for the object light L1 by applying the voltage between the reflective layer 20 and the conductive pattern layer 30.

An example of a method of manufacturing the light modulator 1A according to the above embodiment is briefly described. First, a LNOI substrate including an $SiO_2$ layer serving as the base layer 10 and an Au layer serving as the reflective layer 20, and further, a Z-cut LN crystal thin film layer serving as the modulation layer 25 provided thereon is prepared, and the LNOI substrate is cleaned by using general organic cleaning. In this case, for example, ultrasonic cleaning of the LNOI substrate is performed in acetone, IPA, or ethanol. Next, a Cr layer of a thickness of about 100 nm is formed on the LN layer of the LNOI substrate using a sputtering apparatus.

Subsequently, a photoresist (for example, AZ5200NJ) is spin-coated on the Cr layer with, for example, 4000 rpm and 30 sec, and a resist pattern is formed by photolithography. Next, dry etching of the Cr layer is performed using the resist pattern as a protective film to form a Cr mask pattern. Further, subsequently, the LN layer is dry-etched to expose a part of the Au reflective layer serving as the electrode portion, the remaining resist is removed by $O_2$ ashing, and Cr is removed by wet etching. Ar, $O_2$, and $Cl_2$ can be used for etching of Cr. Ar, $Cl_2$, and $BCl_3$ can be used for etching of the LN layer.

Then, a sputtering apparatus is used to form an Au layer of a thickness of about 100 nm serving as the conductive pattern layer 30 on the LN layer of the LNOI substrate. Next, as a pre-treatment, for the purpose of improving wettability and adhesion between the Au layer and the resist, a surface active agent (for example, Tokyo Ohka OAP) is applied, and spin coating is performed with, for example, 3000 rpm and 30 sec, followed by baking at 120° C. for 1 minute.

Subsequently, an EB resist (for example, ZEP520A) is applied on the Au layer and spin coated to a thickness of about 200 nm. Thereafter, an electron beam lithography apparatus is used to perform lithography and development, thereby forming a resist pattern having a subwavelength structure. Next, dry etching of the Au layer is performed using the resist pattern as a protective film to form the subwavelength structure of the Au layer. As a gas for dry etching, for example, Ar can be used. Thereafter, the EB resist used as a mask for etching the Au layer is removed by $O_2$ ashing. Then, electrical connection with a mount is performed by wire bonding or the like with the Au layer.

An operation principle and a modulation property of the light modulator 1A according to the above embodiment will be described more specifically with reference to FIG. 3 and FIG. 7.

As described above for FIG. 3, TM polarized light is perpendicularly incident on the light modulator 1A having the MIM structure as the object light L1. In this case, a pair of currents oscillating in opposite directions is induced in the pattern portion 31 of the conductive pattern layer 30 and the reflective layer 20 by the oscillating electric field of the incident field (arrows A1), and these currents induce a magnetic field inside the modulation layer 25. In addition, a dipole electric resonance is formed between the pattern portion 31 and the reflective layer 20 in the modulation layer 25 (arrows A2). Thus, a large electric field can be formed inside the modulation layer 25.

Further, since the interference of the two dipoles formed between the pattern portion 31 and the reflective layer 20 results in a π shift, reflected light output from the light modulator 1A as the modulated light L2 is completely cancelled in the far field. Thus, these localized electric and magnetic dipole resonances result in strong absorption of the light described above.

In addition, free electrons in the metal induced by the electric field of the incident light form plasmons at the metal-insulator interface. As schematically illustrated in FIG. 7, the incident light coupled with the plasmons generates a wavenumber β in the x-axis direction from the periodicity of the grating structure of the conductive pattern layer 30 in the lateral direction, and when the following Formula (2) is satisfied, the light is strongly confined in the modulation layer 25.

$$\beta \cdot s + \varphi = m\pi \quad (2)$$

In the above Formula, β is the wavenumber in the x-axis direction as described above, s is the pattern width in the conductive pattern layer 30, φ is a phase change in the boundary surface of the periodic structure, and m is a positive even number.

Figure 7:
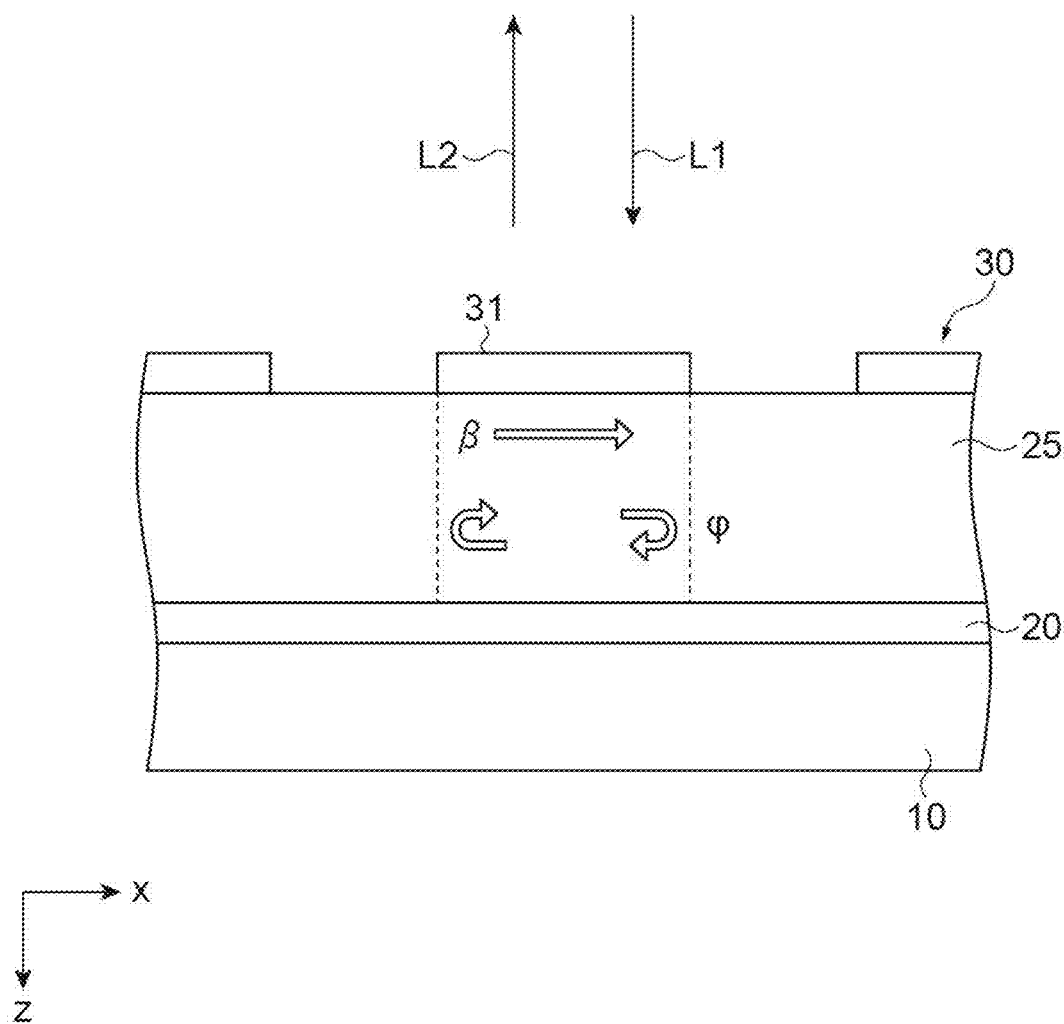
FIG. 7 is a partially enlarged view of the configuration of the light modulator illustrated in FIG. 2A.

In addition, as to the phase change φ in Formula (2), in the above structure, there is no substantial boundary surface in the modulation layer 25, and as indicated by dashed lines in FIG. 7, an effective refractive index is different between the portion having the pattern portion 31 of the conductive pattern layer 30 thereon and the portion not having the pattern portion 31, and thus, reflection due to the refractive index difference occurs on the boundary surface.

Figure 8:
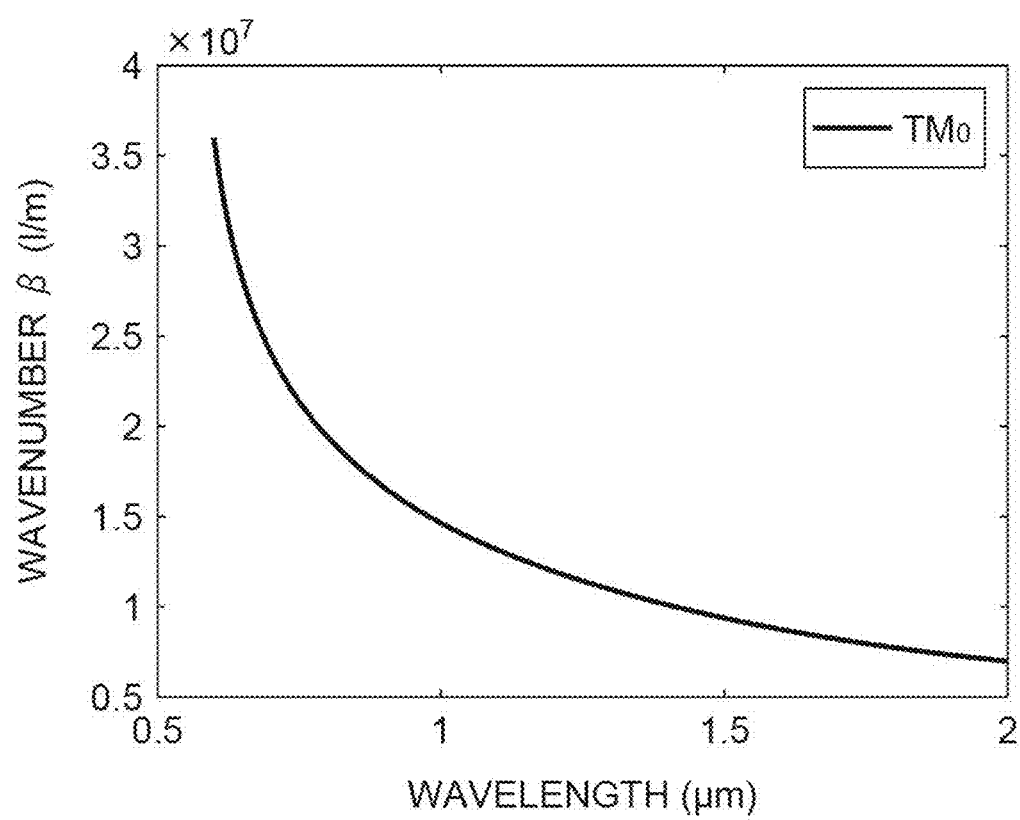
FIG. 8 is a graph showing wavelength dependency of a wavenumber propagating in a modulation layer in an x-axis direction.

In the above Formula (2), the wavenumber β is a wavenumber propagating in the x-axis direction in the modulation layer 25 interposed between the reflective layer 20 and the conductive pattern layer 30 being the metal layers, and may be determined using a finite difference eigenmode (FDE) method. FIG. 8 is a graph showing wavelength dependency of the wavenumber β propagating in the modulation layer 25 in the x-axis direction. In the graph of FIG. 8, the horizontal axis indicates the wavelength (μm) of light, and the vertical axis indicates the wavenumber β (1/m).

From the above results, it can be seen that light of TM0 mode propagates in the MIM structure formed by the reflective layer 20, the modulation layer 25, and the conductive pattern layer 30. In addition, in the MIM structure, high-order modes such as TM1 and TM2 can be propagated, but the electric field strength of the light confined in the modulation layer 25 is high in the TM0 mode. Therefore, in the light modulator 1A of the present embodiment, the TM0 mode is used. Further, in the light modulator 1A, m=2 is used in the above Formula (2). A mode propagating in the MIM structure in this case is referred to as a TM02 mode.

Figure 9:
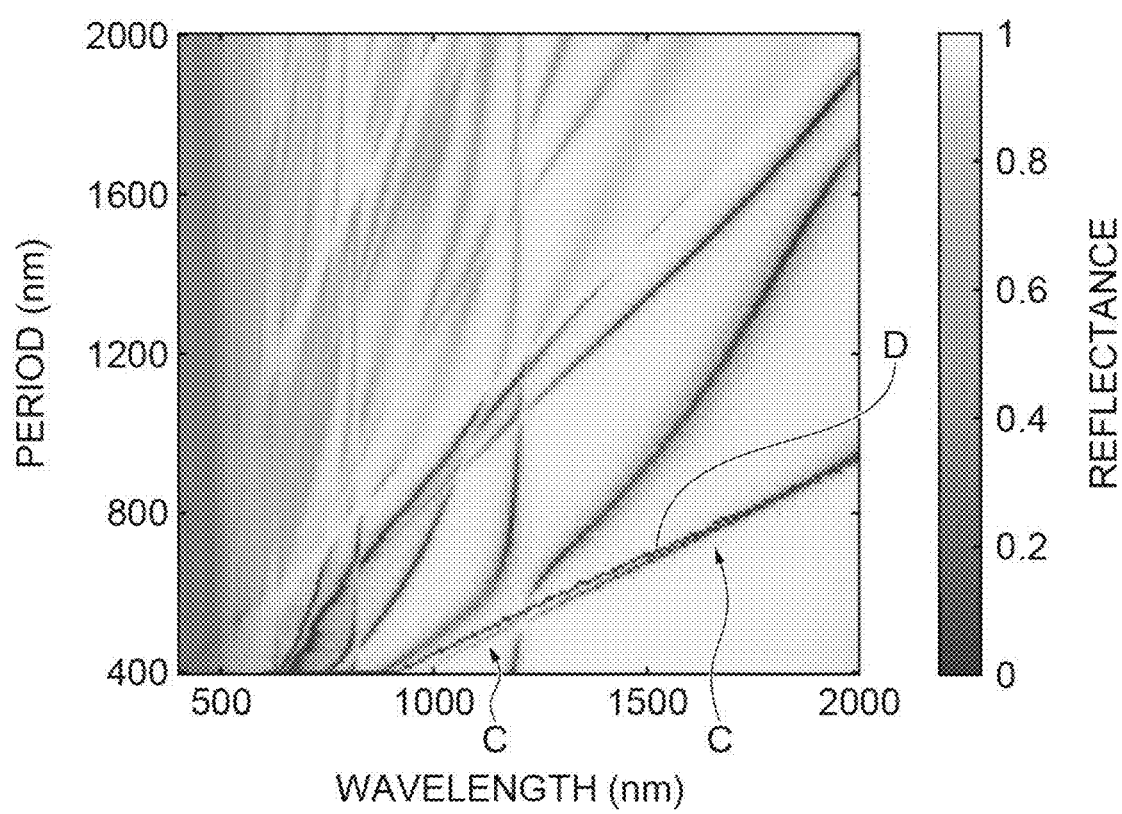
FIG. 9 is a diagram showing the change of the reflection spectrum when the arrangement period of the grating pattern in the conductive pattern layer is changed.

FIG. 9 is a diagram showing the change of the reflection spectrum when the arrangement period Λ of the grating pattern in the conductive pattern layer 30 is changed, similarly to FIG. 4. In FIG. 9, a straight line D obtained by m=2 in the above Formula (2) is indicated together with the dip region C (see FIG. 4) used for the intensity modulation of the object light L1, and it can be seen that the straight line D matches the dip region C well. Therefore, by using the region C for the intensity modulation, it is possible to realize the light modulator 1A capable of highly efficient modulation operation.

The thickness of the modulation layer 25 made of the nonlinear optical crystal in the light modulator 1A according to the above embodiment will be described. The thickness tg of the modulation layer 25 may be determined from, for example, a reflection spectrum analysis by a rigorous coupled wave analysis (RCWA) method or a finite difference time domain (FDTD) method and an electric field strength analysis result of the modulation layer 25.

Figure 10A:
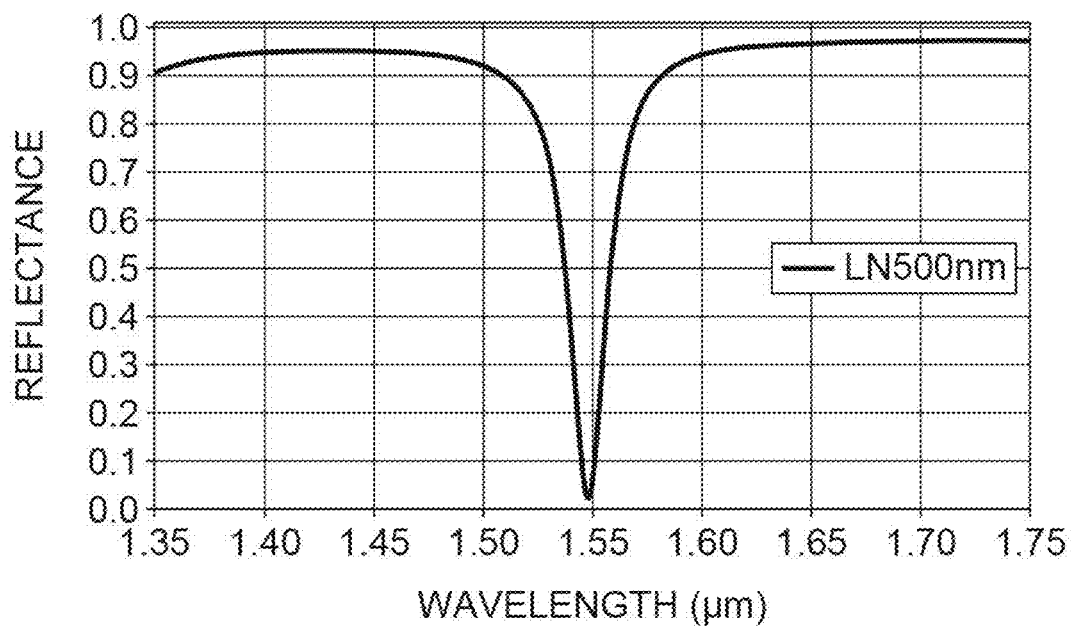
FIG. 10A and FIG. 10B are diagrams showing (A) wavelength dependency of a light reflectance and (B) an electric field strength distribution in the light modulator, when a thickness of the LN modulation layer is set to 500 nm.
Figure 10B:
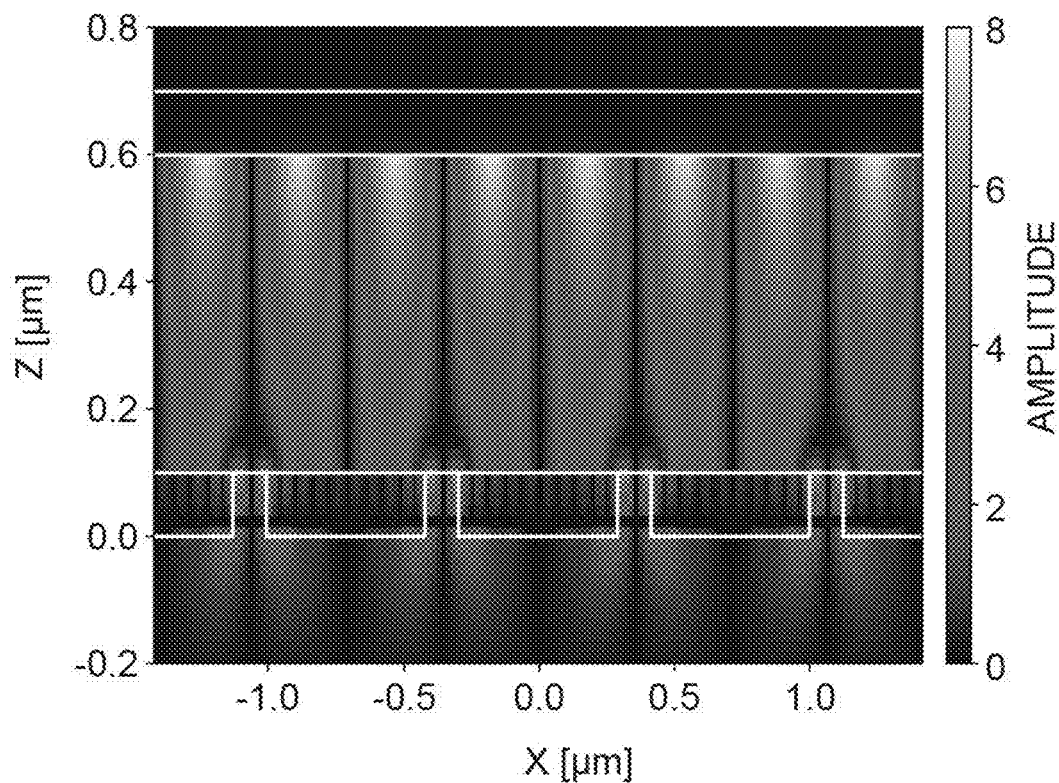

FIG. 10A and FIG. 10B are diagrams showing the property of the light modulator 1A, when the thickness of the LN modulation layer 25 is set to tg=500 nm. FIG. 10A is a graph showing wavelength dependency of the reflectance of light. In the graph of FIG. 10A, the horizontal axis indicates the wavelength (μm) of the object light, and the vertical axis indicates the reflectance. In this reflection spectrum, a peak position of the dip of the reflectance is at a wavelength of λ=1548 nm. In addition, the peak position in the graph of FIG. 10A is slightly different from the peak position in the graph of FIG. 5, and this is due to a specific calculation method, a difference in optical parameters used in the calculation, and the like.

FIG. 10B shows an electric field strength distribution in the xz cross-section (see FIG. 3) in the light modulator. In the distribution diagram of FIG. 10B, the horizontal axis indicates x (μm), and the vertical axis indicates z (μm). Further, white lines in the drawing indicate boundaries of the respective layers of the base layer 10, the reflective layer 20, the LN modulation layer 25, and the conductive pattern layer 30 from the positive side of z. In this configuration example, it can be seen that an electric field strength in the LN modulation layer 25 is large, a Q value of the reflection spectrum (value obtained by dividing an attenuation peak wavelength of the reflection spectrum by a half width) is also high, and thus, a preferable property is obtained.

Figure 11A:
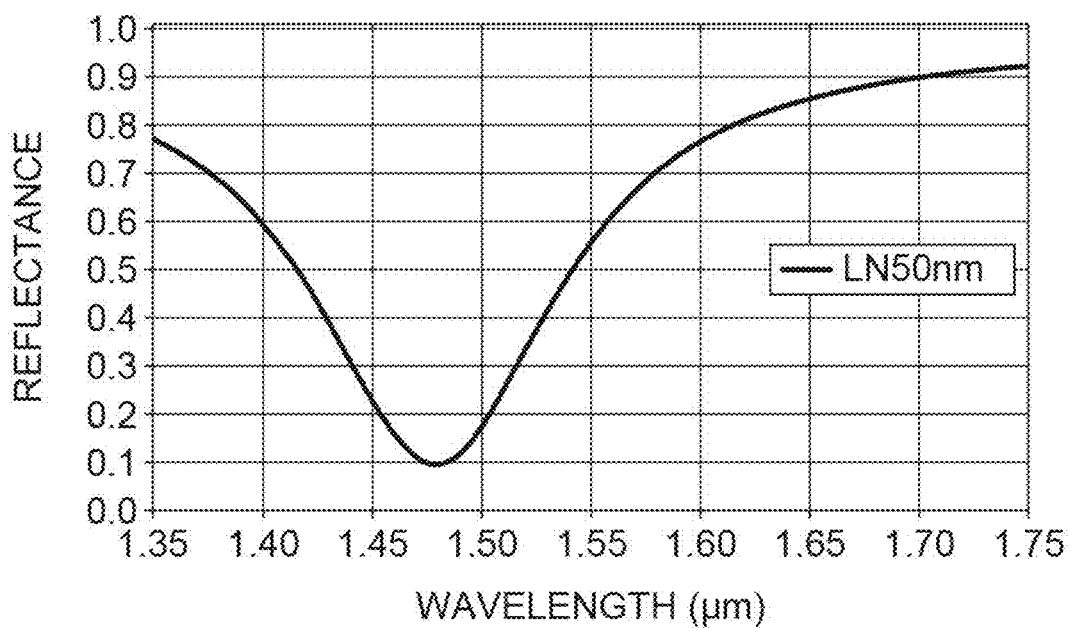
FIG. 11A and FIG. 11B are diagrams showing (A) wavelength dependency of the light reflectance and (B) the electric field strength distribution in the light modulator, when the thickness of the LN modulation layer is set to 50 nm.
Figure 11B:
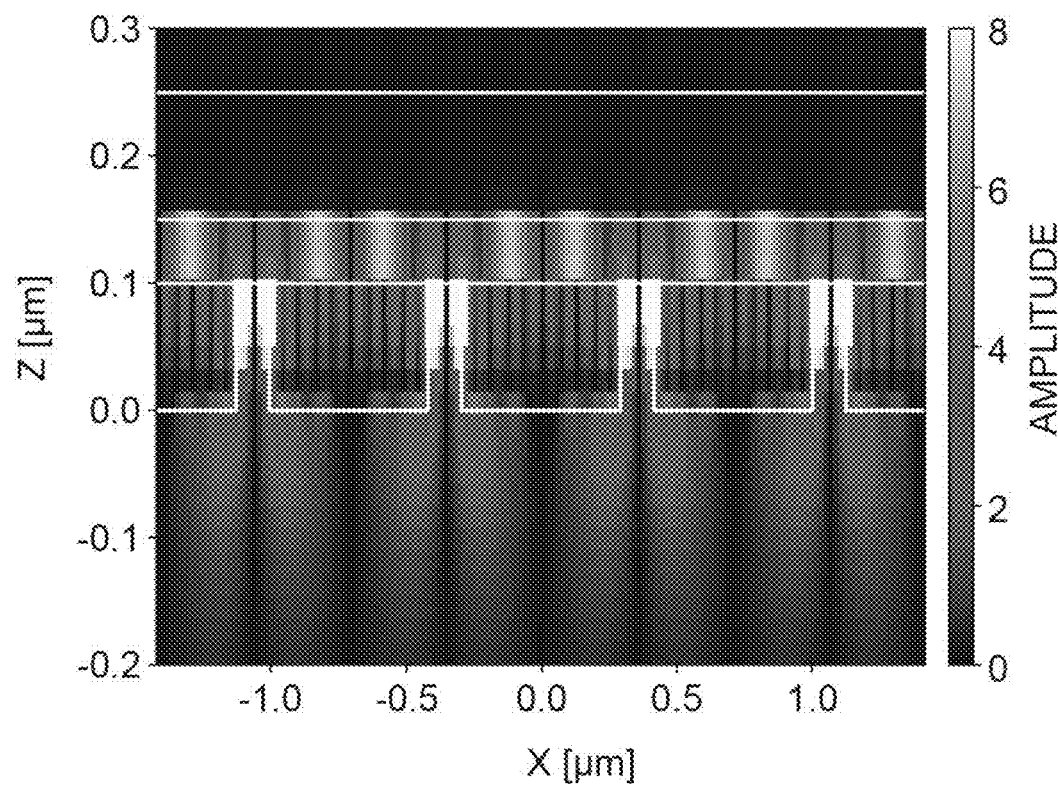
Figure 12A:
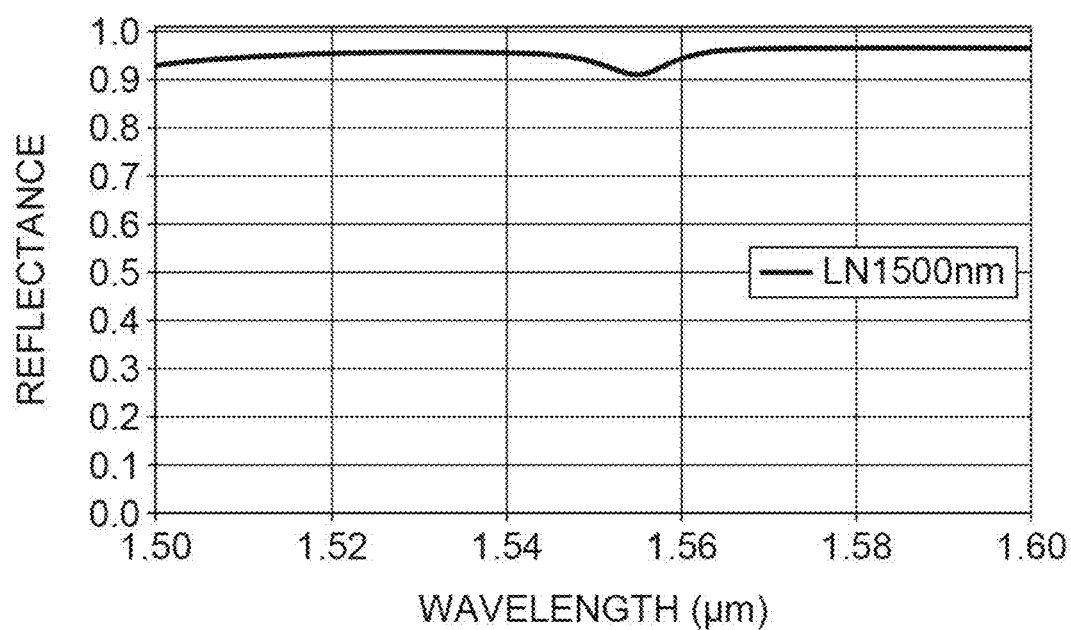
FIG. 12A and FIG. 12B are diagrams showing (A) wavelength dependency of the light reflectance and (B) the electric field strength distribution in the light modulator, when the thickness of the LN modulation layer is set to 1500 nm.
Figure 12B:
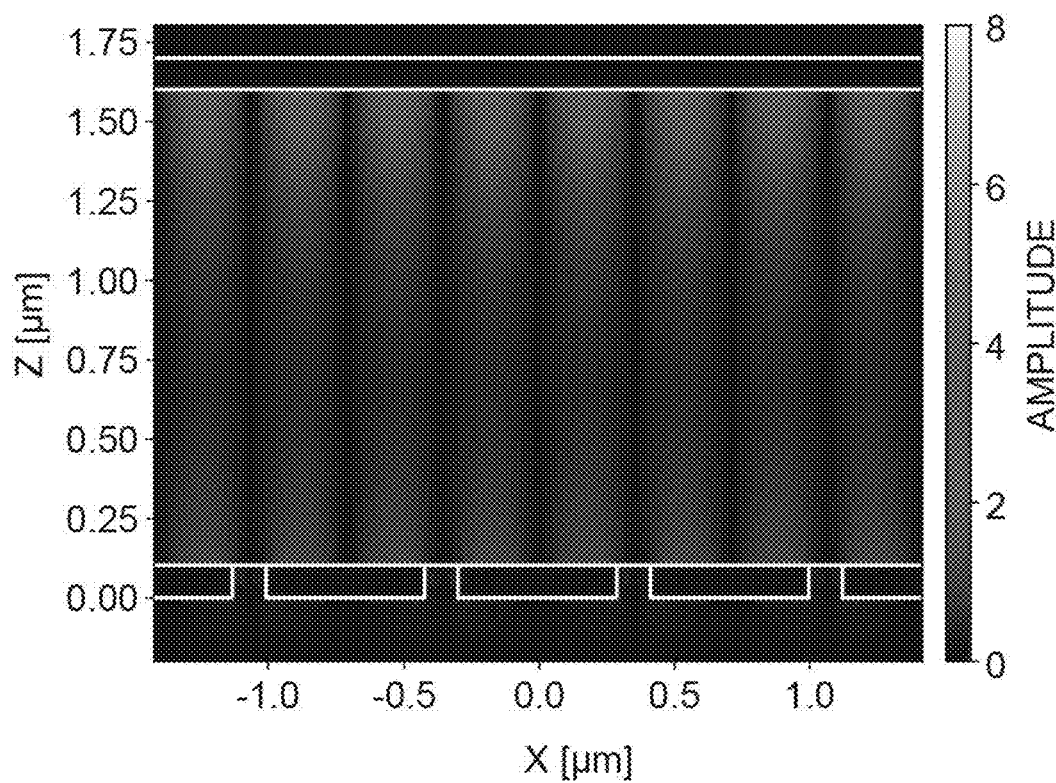

FIG. 11A and FIG. 11B are diagrams showing (A) wavelength dependency of the reflectance of light and (B) the electric field strength distribution in the light modulator, when the thickness of the LN modulation layer 25 is set to tg=50 nm. In the reflection spectrum of FIG. 11A, the peak position is at a wavelength of λ=1479 nm. FIG. 12A and FIG. 12B are diagrams showing (A) wavelength dependency of the reflectance of light and (B) the electric field strength distribution in the light modulator, when the thickness of the LN modulation layer 25 is set to tg=1500 nm. In the reflection spectrum of FIG. 12A, the peak position is at a wavelength of λ=1555 nm.

From the above results, it is preferable to set the thickness of the modulation layer 25 within a range of, for example, 50 nm to 1500 nm. Further, when defined by the wavelength λ of the object light L1, it is preferable to set the thickness of the modulation layer 25 within a range of 0.03λ to 1λ.

In addition, when the modulation layer 25 is as thin as 50 nm, as shown in FIG. 11A and FIG. 11B, the electric field in the modulation layer 25 becomes strong, but the Q value of the reflection spectrum becomes small, and thus, the extinction ratio of light when the modulation voltage is applied cannot be increased. On the other hand, when the modulation layer 25 is as thick as 1500 nm, as shown in FIG. 12A and FIG. 12B, the attenuation amount of the reflectance at the dip of the reflection spectrum is small, and the electric field in the modulation layer 25 is not strong. Further, when the thickness of the modulation layer 25 increases, it is necessary to apply a high modulation voltage. The thickness of the modulation layer 25 is preferably set in consideration of these properties and the like.

Further, the property of the light modulator 1A may also change according to a ratio (duty ratio) between the pattern width s and the arrangement period Λ in the conductive pattern layer 30. In the above configuration, when the duty ratio is as small as 0.20 or less, or as large as 0.90 or more, there is no or little attenuation of the reflectance in the dip of the reflection spectrum. Therefore, in this case, it is preferable to set the duty ratio within a range of 0.20 to 0.90.

A modulation speed in the light modulator 1A according to the above embodiment will be described. In this case, an RC time constant is calculated using an equivalent circuit model, and a 3 dB bandwidth is estimated.

Figure 13:
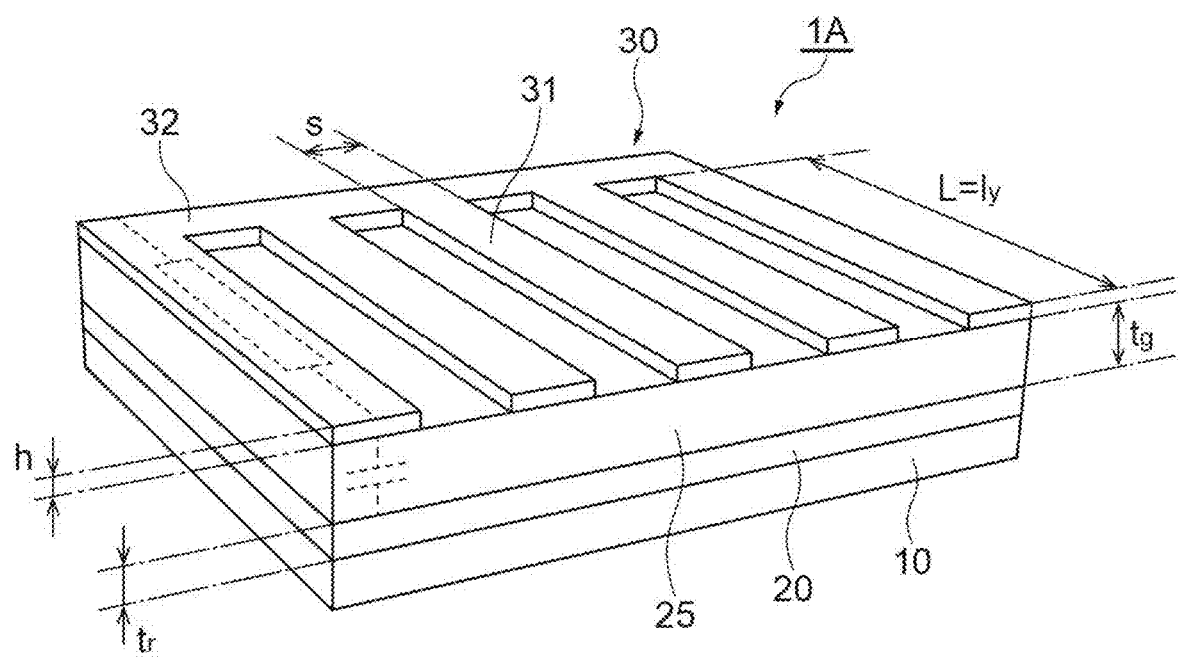
FIG. 13 is a perspective view illustrating an equivalent circuit of the light modulator for obtaining a modulation speed.

FIG. 13 is a perspective view illustrating an equivalent circuit of the light modulator 1A for obtaining the modulation speed. In this diagram, a part including the plurality of pattern portions 31 of the conductive pattern layer 30 in the light modulator 1A is illustrated, and the equivalent circuit is illustrated by dashed lines. Further, the length (pattern size) of the pattern portion 31 of the grating structure in the conductive pattern layer 30 is set to L. This length L corresponds to the width ly in the y-axis direction of the modulation region illustrated in FIG. 1.

In the equivalent circuit illustrated in FIG. 13, a resistance value R and a capacitance C are obtained by the following Formula (3) and Formula (4) using a parallel plate model.

$$R = \frac{2L}{\sigma_{Au} n s h} \qquad (3)$$

$$C = \frac{\varepsilon_0 \varepsilon_{33} n s L}{t_g} \qquad (4)$$

In the above Formulas, $\sigma_{Au}$ is a conductivity of Au and is $4.2 \times 10^7$ (S/m), n is the number of Au gratings, $\varepsilon_0$ is a permittivity of vacuum and is $8.85 \times 10^{-12}$ (F/m), and $\varepsilon_{33}$ is a relative permittivity in the crystal axis direction of lithium niobate and is 27.9.

Further, the 3 dB bandwidth $f_{3dB}$ is obtained by the following Formula (5) using the resistance value R and the capacitance C described above.

$$f_{3dB} = \frac{1}{2\pi RC} \quad (5)$$

Figure 14:
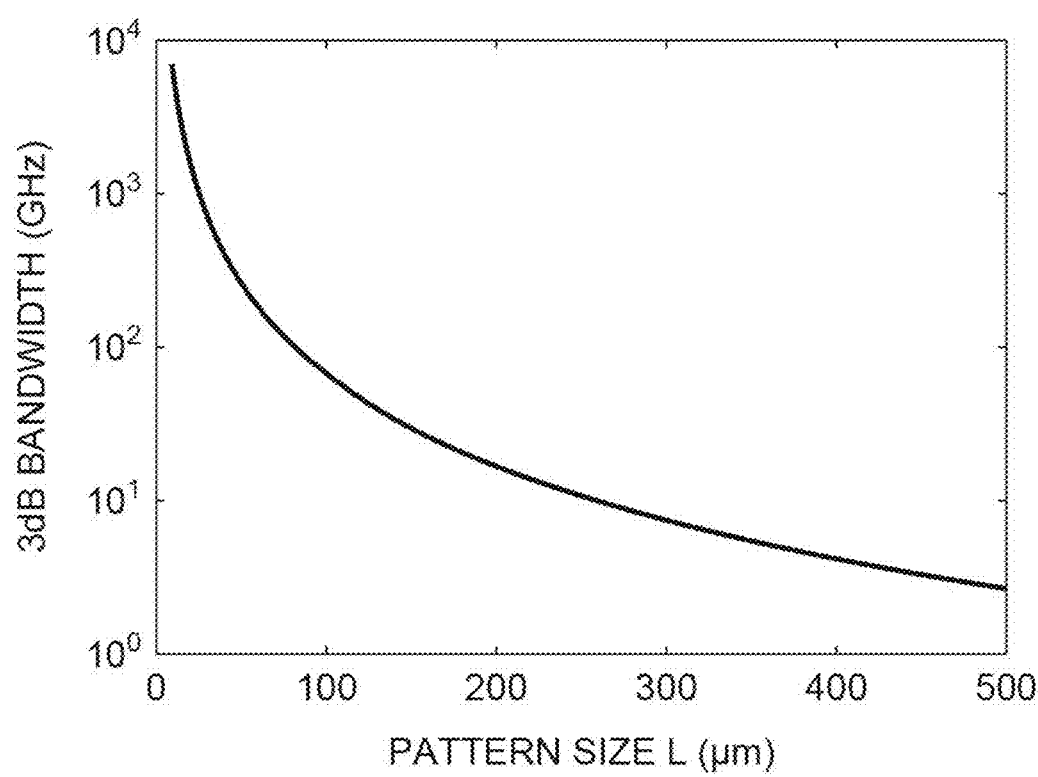
FIG. 14 is a graph showing pattern size dependency of a 3 dB bandwidth in the light modulator.

FIG. 14 is a graph showing pattern size dependency of the 3 dB bandwidth in the light modulator 1A obtained using the above Formula.

In the graph of FIG. 14, the horizontal axis indicates the pattern size L (μm), and the vertical axis indicates the 3 dB bandwidth (GHz). In the light modulator 1A of the above configuration, when the pattern size is set to L=300 μm, the 3 dB bandwidth is $f_{3dB}$=7.52 GHz.

A configuration of a light modulator array using the light modulator 1A of the above configuration will be described. The light modulator array may be configured by using a plurality of light modulators 1A being unit modulation cells, and arranging the plurality of light modulator 1A in a one-dimensional or two-dimensional array. Specifically, for example, in the light modulator array, with M being an integer of 1 or more and N being an integer of 2 or more, the plurality of light modulators (plurality of modulation cells) may be arranged in a one-dimensional or two-dimensional array in M rows and N columns. According to the above configuration, it is possible to suitably realize phase modulation of the object light by a one-dimensional or two-dimensional modulation pattern using the above light modulator 1A as a modulation pixel.

Figure 15:
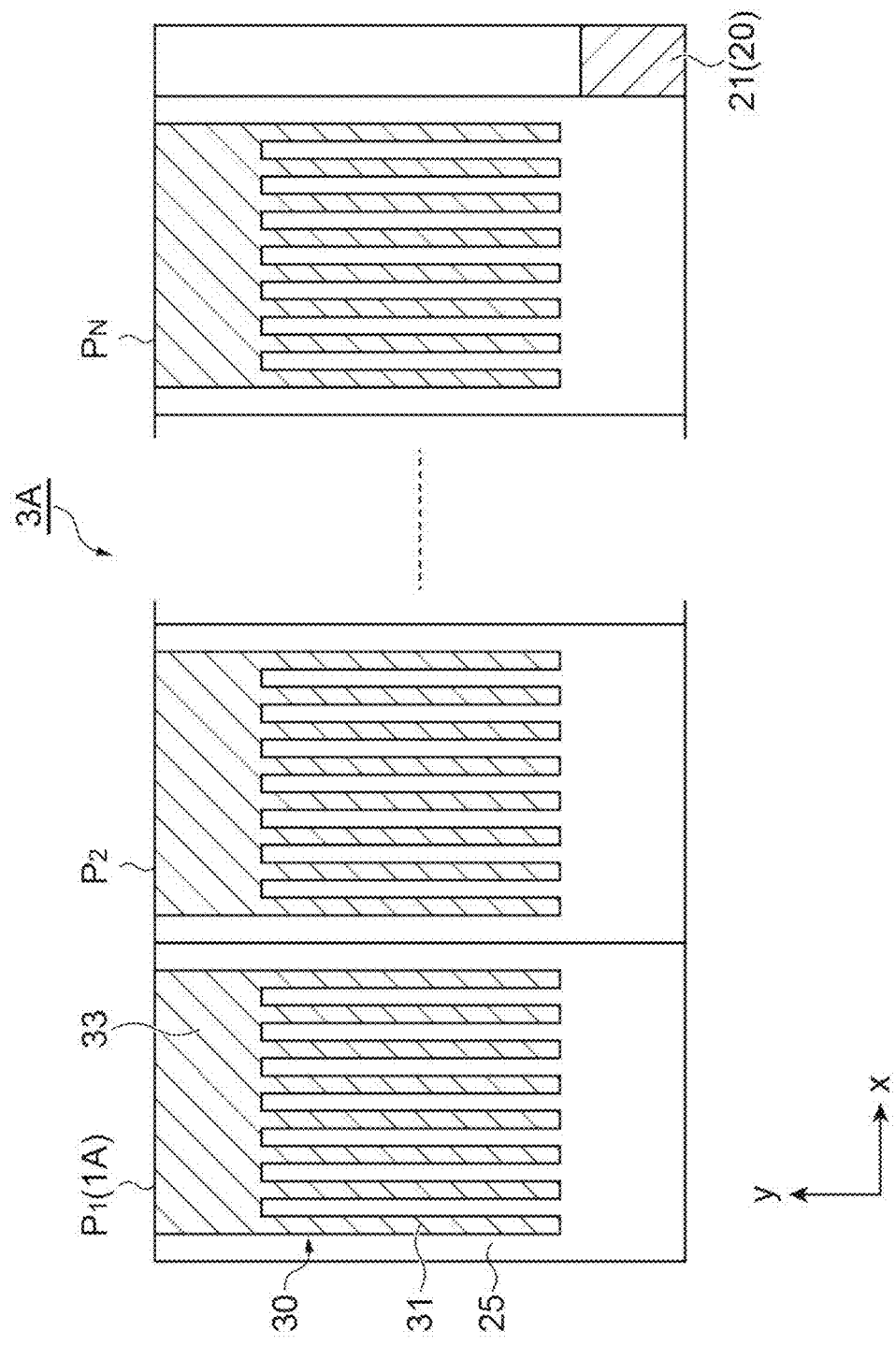
FIG. 15 is a plan view illustrating a configuration of a one-dimensional light modulator array using the light modulator.

FIG. 15 is a plan view illustrating a configuration of a one-dimensional light modulator array using the light modulator 1A illustrated in FIG. 1. The light modulator array 3A in the present configuration example uses the light modulators 1A, each having the configuration illustrated in FIG. 1, FIG. 2A, and FIG. 2B and including the base layer 10, the reflective layer 20, the modulation layer 25, and the conductive pattern layer 30, as N modulation cells $P_1$ to $P_N$, and is configured by arranging the modulation cells in a one-dimensional array with the x-axis direction as the arrangement direction.

In addition, in the present configuration example, the electrode portion 21 of the reflective layer 20 provided between the base layer 10 and the modulation layer 25 is formed as the electrode portion 21 common to all of the N modulation cells $P_1$ to $P_N$ as illustrated in FIG. 15. Further, the base layer 10 may be individually provided for the N modulation cells $P_1$ to $P_N$ or may be integrally provided.

Figure 16:
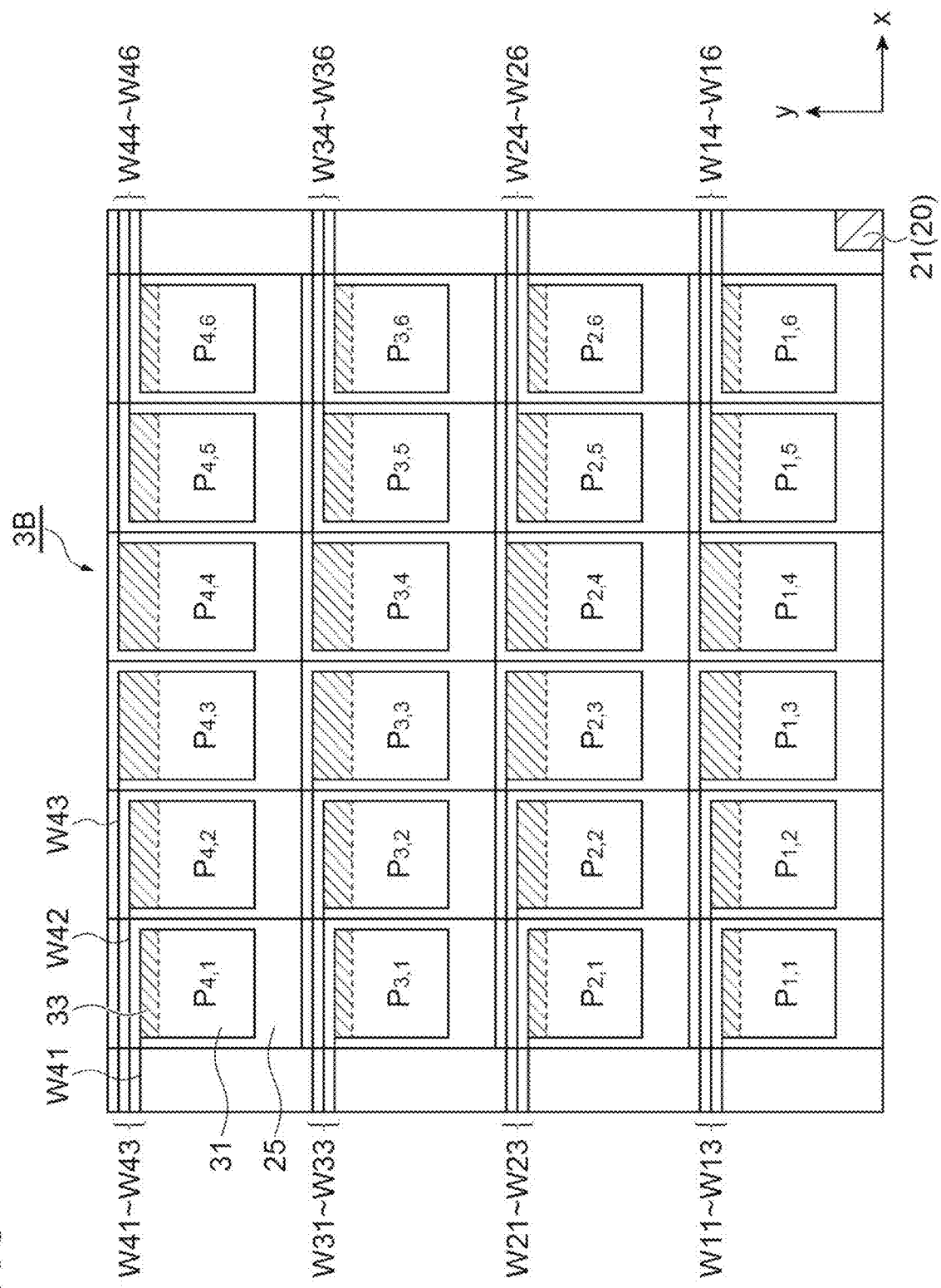
FIG. 16 is a plan view illustrating a configuration of a two-dimensional light modulator array using the light modulator.

FIG. 16 is a plan view illustrating a configuration of a two-dimensional light modulator array using the light modulator 1A illustrated in FIG. 1. The light modulator array 3B in the present configuration example uses the light modulators 1A, each having the configuration illustrated in FIG. 1, FIG. 2A, and FIG. 2B and including the base layer 10, the reflective layer 20, the modulation layer 25, and the conductive pattern layer 30, as 4×6 modulation cells $P_{1,1}$ to $P_{4,6}$, and is configured by arranging the modulation cells in a two-dimensional array with the x-axis direction and the y-axis direction as the arrangement directions. In addition, in FIG. 16, a specific configuration of the plurality of pattern portions 31 in the conductive pattern layer is not illustrated.

In the light modulator array 3B of the present configuration example, for the modulation cells $P_{1,1}$ to $P_{1,6}$ of the first row, individual modulation signal lines (voltage application lines) W11 to W13 and W14 to W16 are connected to the electrode pattern portions 33 of the modulation cells of the respective columns. Further, for the modulation cells $P_{2,1}$ to $P_{2,6}$ of the second row, individual modulation signal lines W21 to W23 and W24 to W26 are connected. Further, for the modulation cells $P_{3,1}$ to $P_{3,6}$ of the third row, individual modulation signal lines W31 to W33 and W34 to W36 are connected. Further, for the modulation cells $P_{4,1}$ to $P_{4,6}$ of the fourth row, individual modulation signal lines W41 to W43 and W44 to W46 are connected.

In addition, In the present configuration example, the electrode portion 21 of the reflective layer 20 provided between the base layer 10 and the modulation layer 25 is formed as the electrode portion 21 common to all of the 4×6 modulation cells $P_{1,1}$ to $P_{4,6}$ as in the configuration illustrated in FIG. 15. Further, the base layer 10 may be individually provided for the 4×6 modulation cells $P_{1,1}$ to $P_{4,6}$ or may be integrally provided.

Figure 17:
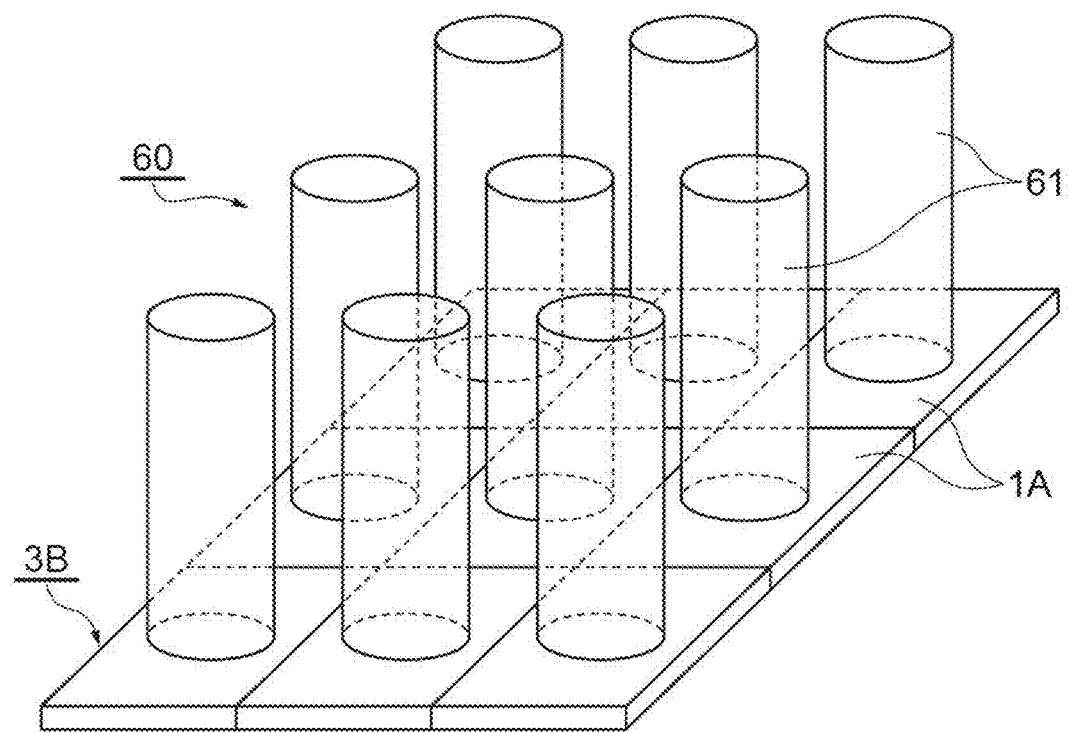
FIG. 17 is a perspective view schematically illustrating a coupling configuration of the two-dimensional light modulator array and an optical fiber array.

Further, in the light modulator array in which the plurality of light modulators 1A are arranged in an array form as illustrated in FIG. 15 and FIG. 16, since the light modulator 1A has a vertical incidence type configuration, it is possible to suitably realize coupling with an optical fiber array. FIG. 17 is a perspective view schematically illustrating a coupling configuration of the two-dimensional light modulator array and the optical fiber array. In this diagram, the coupling configuration provided between the light modulator array 3B illustrated in FIG. 16 in which the plurality of light modulators 1A are arranged in a two-dimensional array and an optical fiber array 60 in which a plurality of optical fibers 61 are arranged in a two-dimensional array is illustrated. In this configuration, the light modulators 1A of the light modulator array 3B and the optical fibers 61 of the optical fiber array 60 are coupled in one-to-one correspondence.

In the light modulator 1A of the vertical incidence type having the above configuration, the modulation cell can be downsized and highly integrated as described above, and the light modulator can be suitably applied to, for example, spatial multiplexing optical communication, high-speed optical wireless communication, and the like. Further, for example, in order to cope with an increase in communication data transmission capacity in beyond 5G, the light modulator can be applied as an ultrahigh-speed and small-sized light modulator which can be mounted on a high-speed and large-capacity optical transceiver. In the beyond 5G technology, a modulation speed of 1 GHz or more per channel is required.

The light modulator and the light modulator array are not limited to the embodiments and configuration examples described above, and various modifications are possible. For example, as to the pattern in the conductive pattern layer 30, the configuration including the plurality of pattern portions 31, the connection pattern portion 32, and the electrode pattern portion 33 is used in the above embodiment, and further, it is not limited to the above configuration, and specifically, various patterns may be used.

The light modulator of the above embodiment includes (1) a base layer; (2) a reflective layer made of a metal material having a reflecting property for object light being a modulation object and formed on an upper surface of the base layer; (3) a modulation layer made of a nonlinear optical crystal having a transmitting property for the object light and formed on an upper surface of the reflective layer with a predetermined thickness; and (4) a conductive pattern layer made of a conductive material, including a plurality of pattern portions arranged periodically in a first direction perpendicular to a lamination direction of the respective layers and each extending in a second direction perpendicular to the lamination direction and the first direction, and formed on an upper surface of the modulation layer, and (5) the modulation layer is configured to change a reflectance for the object light by changing a refractive index when a voltage is applied between the reflective layer and the conductive pattern layer, and the object light being incident from the upper surface of the modulation layer through the conductive pattern layer, transmitted through the modulation layer, and reflected by the reflective layer is output from the upper surface of the modulation layer to the outside as modulated light with an intensity modulated by the reflectance change.

In the above light modulator, an arrangement period of the plurality of pattern portions in the conductive pattern layer may be set to be less than a wavelength of the object light. As described above, by using the subwavelength structure (metasurface structure) in which the arrangement period is set to be smaller than the object wavelength in the plurality of pattern portions of the conductive pattern layer arranged on the modulation layer, intensity modulation of the object light can be suitably realized.

In the above light modulator, a pattern width of the plurality of pattern portions in the conductive pattern layer may be set to be constant. As described above, by forming the plurality of pattern portions of the conductive pattern layer arranged on the modulation layer with the grating pattern having the constant pattern width, intensity modulation of the object light can also be suitably realized.

In the above light modulator, each of a thickness of the reflective layer and a thickness of the conductive pattern layer may be set to be a skin depth or more. According to the above configuration, reflectance control and intensity modulation of the object light by the metal reflective layer, the modulation layer, and the conductive pattern layer can be suitably realized.

As to the materials of the respective layers constituting the above light modulator, the nonlinear optical crystal of the modulation layer may include at least one of lithium niobate and lithium tantalate. Further, the conductive material of the conductive pattern layer may be a metal material.

The light modulator array of the above embodiment includes a plurality of light modulators of the above configuration, and the plurality of light modulators are arranged in a one-dimensional or two-dimensional array. Further, specifically, for example, in the light modulator array, with M being an integer of 1 or more and N being an integer of 2 or more, the plurality of light modulators may be arranged in a one-dimensional or two-dimensional array in M rows and N columns. According to the above configuration, it is possible to suitably realize intensity modulation of the object light by a one-dimensional or two-dimensional modulation pattern using the light modulator having the above configuration as a modulation cell (modulation pixel).

The embodiments can be used as a light modulator and a light modulator array capable of modulating an intensity of modulation object light at high speed and suitably operating in a wide wavelength region.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A light modulator comprising:
a base layer;
a reflective layer made of a metal material having a reflecting property for object light being a modulation object and formed on an upper surface of the base layer;
a modulation layer made of a nonlinear optical crystal having a transmitting property for the object light and formed on an upper surface of the reflective layer with a predetermined thickness; and
a conductive pattern layer made of a conductive material, including a plurality of pattern portions arranged periodically in a first direction perpendicular to a lamination direction of the respective layers and each extending in a second direction perpendicular to the lamination direction and the first direction, and formed on an upper surface of the modulation layer, wherein
the modulation layer is configured to change a reflectance for the object light by changing a refractive index when a voltage is applied between the reflective layer and the conductive pattern layer,
the object light being incident from the upper surface of the modulation layer through the conductive pattern layer, transmitted through the modulation layer, and reflected by the reflective layer is output from the upper surface of the modulation layer to the outside as modulated light with an intensity modulated by the reflectance change, and
an arrangement period of the plurality of pattern portions in the conductive pattern layer is set to be less than a wavelength of the object light.

2. The light modulator according to claim 1, wherein a pattern width of the plurality of pattern portions in the conductive pattern layer is set to be constant.

3. The light modulator according to claim 1, wherein each of a thickness of the reflective layer and a thickness of the conductive pattern layer is set to be a skin depth or more.

4. The light modulator according to claim 1, wherein the nonlinear optical crystal of the modulation layer includes at least one of lithium niobate and lithium tantalate.

5. The light modulator according to claim 1, wherein the conductive material of the conductive pattern layer is a metal material.

6. A light modulator array comprising a plurality of light modulators according to claim 1, wherein
the plurality of light modulators are arranged in a one-dimensional or two-dimensional array.

* * * * *